United States Patent
Takahashi et al.

(10) Patent No.: US 10,871,542 B2
(45) Date of Patent: Dec. 22, 2020

(54) DIRECTION ESTIMATING DEVICE THAT ESTIMATES RADIOWAVE ARRIVING DIRECTION, DIRECTION ESTIMATING METHOD, FLYING DEVICE, FLYING METHOD, AND NON-TRANSITORY RECORDING MEDIUM

(71) Applicant: CASIO COMPUTER CO., LTD., Shibuya-ku, Tokyo (JP)

(72) Inventors: Toshihiro Takahashi, Kunitachi (JP); Takahiro Mizushina, Kawagoe (JP); Shunsuke Yamada, Tachikawa (JP); Hideaki Matsuda, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 281 days.

(21) Appl. No.: 15/666,530

(22) Filed: Aug. 1, 2017

(65) Prior Publication Data
US 2018/0081021 A1 Mar. 22, 2018

(30) Foreign Application Priority Data

Sep. 20, 2016 (JP) .................................. 2016-183369

(51) Int. Cl.
*G01S 3/30* (2006.01)
*B64D 47/08* (2006.01)
(Continued)

(52) U.S. Cl.
CPC .............. *G01S 3/30* (2013.01); *B64C 39/024* (2013.01); *B64D 47/08* (2013.01); *G05D 1/0022* (2013.01);
(Continued)

(58) Field of Classification Search
CPC ...... G01S 3/30; B64D 47/08; H04N 5/23203; H04N 7/185; B64C 39/024; G05D 1/0022
See application file for complete search history.

(56) References Cited

U.S. PATENT DOCUMENTS

| 5,294,930 A | * | 3/1994 | Li | ......................... | G01S 13/003 |
| | | | | | 244/3.12 |
| 9,343,806 B2 | | 5/2016 | Desclos et al. | | |

(Continued)

FOREIGN PATENT DOCUMENTS

| JP | 2005109530 A | 4/2005 |
| JP | 2006138681 A | 6/2006 |

(Continued)

OTHER PUBLICATIONS

Chinese Office Action (and English language translation thereof) dated Mar. 31, 2020 issued in counterpart Chinese Application No. 201710599069.4.

(Continued)

*Primary Examiner* — Khoi H Tran
*Assistant Examiner* — Rodney P King
(74) *Attorney, Agent, or Firm* — Holtz, Holtz & Volek PC

(57) ABSTRACT

A direction estimating device includes a plurality of antennas placed on a front surface of a board to have different main lobe directions of directivities, at least one antenna placed on a back surface of the board, a radiowave intensity obtainer that obtains a received signal strength indication (RSSI) of a radiowave received by the plurality of antennas placed on the front surface of the board, and by the at least one antenna placed on the back surface of the board, and an estimator that estimates an arriving direction of the radiowave based on the RSSI of the radiowave obtained by the radiowave intensity obtainer.

12 Claims, 14 Drawing Sheets

(51) Int. Cl.
  *G05D 1/00* (2006.01)
  *B64C 39/02* (2006.01)
  *H04N 7/18* (2006.01)
  *H04N 5/232* (2006.01)
  *G05D 1/12* (2006.01)

(52) U.S. Cl.
  CPC ............... *G05D 1/12* (2013.01); *H04N 5/232* (2013.01); *H04N 5/23203* (2013.01); *H04N 7/185* (2013.01)

(56) References Cited

U.S. PATENT DOCUMENTS

| | | | |
|---|---|---|---|
| 2011/0225433 A1* | 9/2011 | Wan | E05B 17/22 713/190 |
| 2012/0133498 A1* | 5/2012 | Nah | B60C 23/0416 340/447 |
| 2013/0187818 A1* | 7/2013 | Desclos | H01Q 1/526 343/770 |
| 2014/0218239 A1 | 8/2014 | Sharawi et al. | |
| 2016/0018509 A1* | 1/2016 | McCorkle | G01S 3/146 342/386 |
| 2017/0029107 A1* | 2/2017 | Emami | B64C 39/024 |

FOREIGN PATENT DOCUMENTS

| | | |
|---|---|---|
| JP | 2007104253 A | 4/2007 |
| JP | 3989677 B2 | 7/2007 |
| JP | 2007170818 A | 7/2007 |
| JP | 2011028660 A | 2/2011 |
| JP | 2012159349 A | 8/2012 |
| JP | 2013197943 A | 9/2013 |
| JP | 2015190762 A | 11/2015 |
| WO | 2010057365 A1 | 5/2010 |
| WO | 2010116231 A1 | 10/2010 |

OTHER PUBLICATIONS

Chinese Office Action (and English language translation thereof) dated Sep. 15, 2020 issued in counterpart Chinese Application No. 201710599069.4.

Japanese Office Action (and English language translation thereof) dated Oct. 20, 2020 issued in counterpart Japanese Application No. 2016-183369.

* cited by examiner

BOARD BOTTOM VIEW (BOARD AS VIEWED FROM BOTTOM)

BOARD PLAN VIEW (BOARD AS VIEWED FROM TOP)

BOARD AS VIEWED FROM BOTTOM

ROBOT FRONT VIEW

ROBOT RIGHT SIDE VIEW

BOARD BOTTOM VIEW (BOARD AS VIEWED FROM BOTTOM)

BOARD PLAN VIEW (BOARD AS VIEWED FROM TOP)

DIRECTION ESTIMATING DEVICE THAT ESTIMATES RADIOWAVE ARRIVING DIRECTION, DIRECTION ESTIMATING METHOD, FLYING DEVICE, FLYING METHOD, AND NON-TRANSITORY RECORDING MEDIUM

CROSS-REFERENCE TO RELATED APPLICATION

This application claims the benefit of Japanese Patent Application No. 2016-183369, filed on Sep. 20, 2016, the entire disclosure of which is incorporated by reference herein.

FIELD

This application relates generally to a direction estimating device that estimates a radiowave arriving direction, a direction estimating method, a flying device, a flying method, and a non-transitory recording medium.

BACKGROUND

Array antennas that have multiple antenna elements arranged regularly, and capable of controlling directivities are known. In addition, technologies of estimating a radiowave arriving direction using an antenna capable of controlling a directivity are also known. For example, Unexamined Japanese Patent Application Kokai Publication No. 2005-109530 discloses a portable wireless terminal that estimates the radiowave arriving direction based on a radiowave received by an array antenna that includes multiple chip antennas placed on a same plane.

According to the portable wireless terminal disclosed in Unexamined Japanese Patent Application Kokai Publication No. 2005-109530, the multiple chip antennas are placed on the same plane, and a straight line extending in a main lobe direction of the directivity of each antenna is also on the same plane. Hence, this portable wireless terminal is capable of estimating the radiowave arriving direction only for a parallel direction to the plane, and is not capable of estimating the radiowave arriving direction for a vertical direction to the plane.

SUMMARY

A direction estimating device according to a first aspect of the present disclosure includes:

a plurality of antennas placed on a first surface to have different main lobe directions of directivities;

at least one antenna placed on a second surface different from the first surface but in parallel with the first surface;

a radiowave intensity obtainer that obtains a received signal strength indication (RSSI) of a radiowave received by the plurality of antennas placed on the first surface, and by the at least one antenna placed on the second surface; and an estimator that estimates an arriving direction of the radiowave based on the RSSI of the radiowave obtained by the radiowave intensity obtainer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of embodiments given below, serve to explain the principles of the invention. A more complete understanding of this application can be obtained when the following detailed description is considered in conjunction with the following drawings, in which.

DETAILED DESCRIPTION

Figure 1:
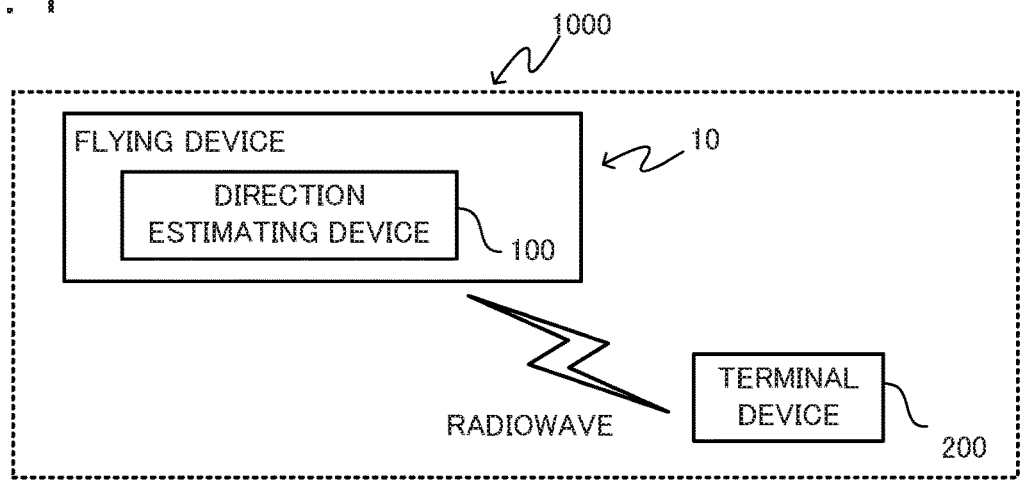
FIG. 1 is a diagram illustrating an example of a structure of a direction estimating system according to Embodiment 1 of the present disclosure.

Embodiments of the present disclosure are described below with reference to the figures. The same or corresponding component is denoted by the same reference numeral throughout the figures.

Embodiment 1

As illustrated in FIG. 1, a direction estimating system 1000 according to Embodiment 1 of the present disclosure includes a flying device 10, and a terminal device 200 capable of transmitting a radiowave. The flying device 10 includes a direction estimating device 100. The terminal device 200 is carried by a user, and transmits a radiowave that can be received by the direction estimating device 100. In addition, the direction estimating device 100 estimates a direction in which the terminal device 200 that is a radiowave transmission originator is present. The flying device 10 flies toward the direction estimated by the direction estimating device 100, thus capable of flying toward the terminal device 200. Hence, even if the user who is carrying the terminal device 200 keeps moving a location, the flying device 10 is capable of keeping flying toward the user. Hence, even if the user keeps moving to another site after throwing far up the flying device 10, the flying device 10 is capable of returning to the user based on the radiowave transmitted from the terminal device 200. The details of such the flying device 10 and the direction estimating device 100 are described below with reference to the figures.

Figure 2:
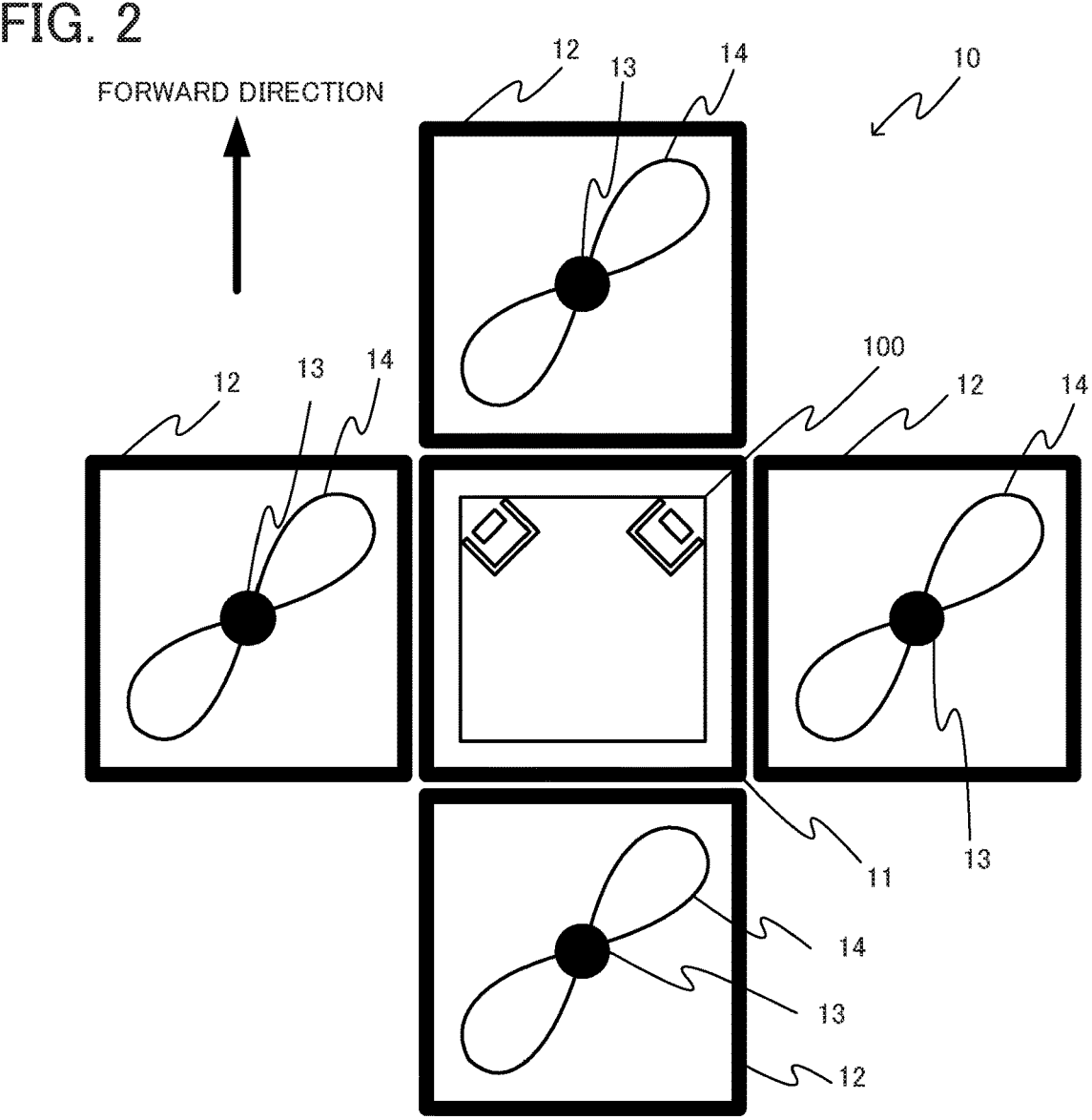
FIG. 2 is a bottom view illustrating an example of a structure of a flying device according to Embodiment 1.

FIG. 2 is a diagram illustrating an example of a structure of the flying device 10 from a bottom direction. The flying device 10 includes a main frame 11, and four motor frames 12 therearound. Each motor frame 12 can support a single motor 13, and a rotor blade 14 is fastened to a motor shaft of the motor 13. The flying device 10 is capable of producing lifting power by rotating the rotor blades 14, and of hovering on the fly. In addition, the flying device 10 is capable of turning during the hovering and tilting a device body, and also moving in back and forth, horizontal and vertical directions by adjusting rotation speeds of the four motors 13. Still further, the flying device 10 has the direction estimating device 100 provided at a lower part of the main frame 11.

Figure 3:
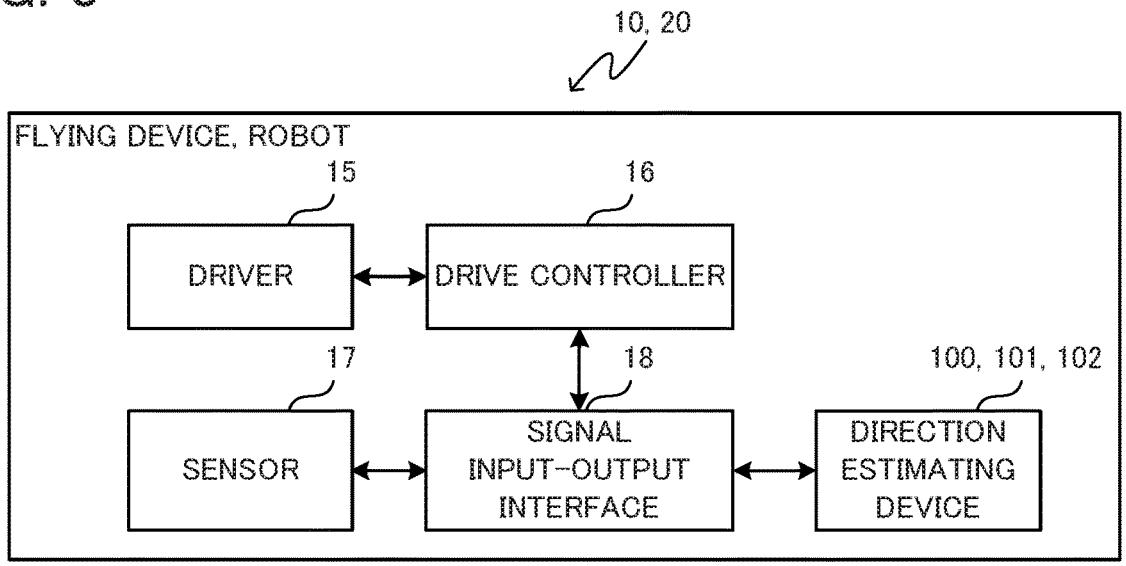
FIG. 3 is a block diagram illustrating a functional structure of the flying device and that of a robot according to Embodiment 1.

Next, a functional structure of the flying device 10 is described. As illustrated in FIG. 3, the flying device 10 includes a driver 15, a drive controller 16, a sensor 17, a signal input-output interface 18, and the direction estimating device 100.

The driver 15 includes the motor 13, and causes the flying device 10 to fly. The drive controller 16 controls the driver 15 to cause the flying device 10 to perform hovering, turning during the hovering, and tilting of the device body, and also flying in back and forth, horizontal and vertical directions.

The sensor 17 includes a gyroscope sensor, an imaging device, and a recording device. The gyroscope sensor obtains an angle and an angular velocity when the flying device 10 turns. The imaging device includes a camera, and captures an image in a forward direction of the flying device 10. The recording device includes a microphone that has the main lobe of the directivity directed in the forward direction of the flying device 10, and records sounds in the forward direction of the flying device 10. The sensor 17 may further include an acceleration sensor, a geomagnetism sensor, a pressure sensor, and the like, in addition to the imaging device and the recording device. By increasing the types of the sensor elements, the information utilized by the flying device 10 and the direction estimating device 100 to determine a flying direction can increase.

The signal input-output interface 18 is an interface that inputs and outputs signals relative to the direction estimating device 100. When, for example, receiving a control signal for the flying action of the flying device 10 from the direction estimating device 100, the signal input-output interface 18 transmits the control signal to the drive controller 16. Hence, the flying device 10 is capable of flying based on the instruction from the direction estimating device 100. In addition, the signal input-output interface 18 outputs information obtained by the sensor 17 to the direction estimating device 100. Hence, the direction estimating device 100 is capable of obtaining the angle and the angular velocity when the flying device 10 turns by the gyroscope sensor, and the like, of the flying device 10.

Figure 4:
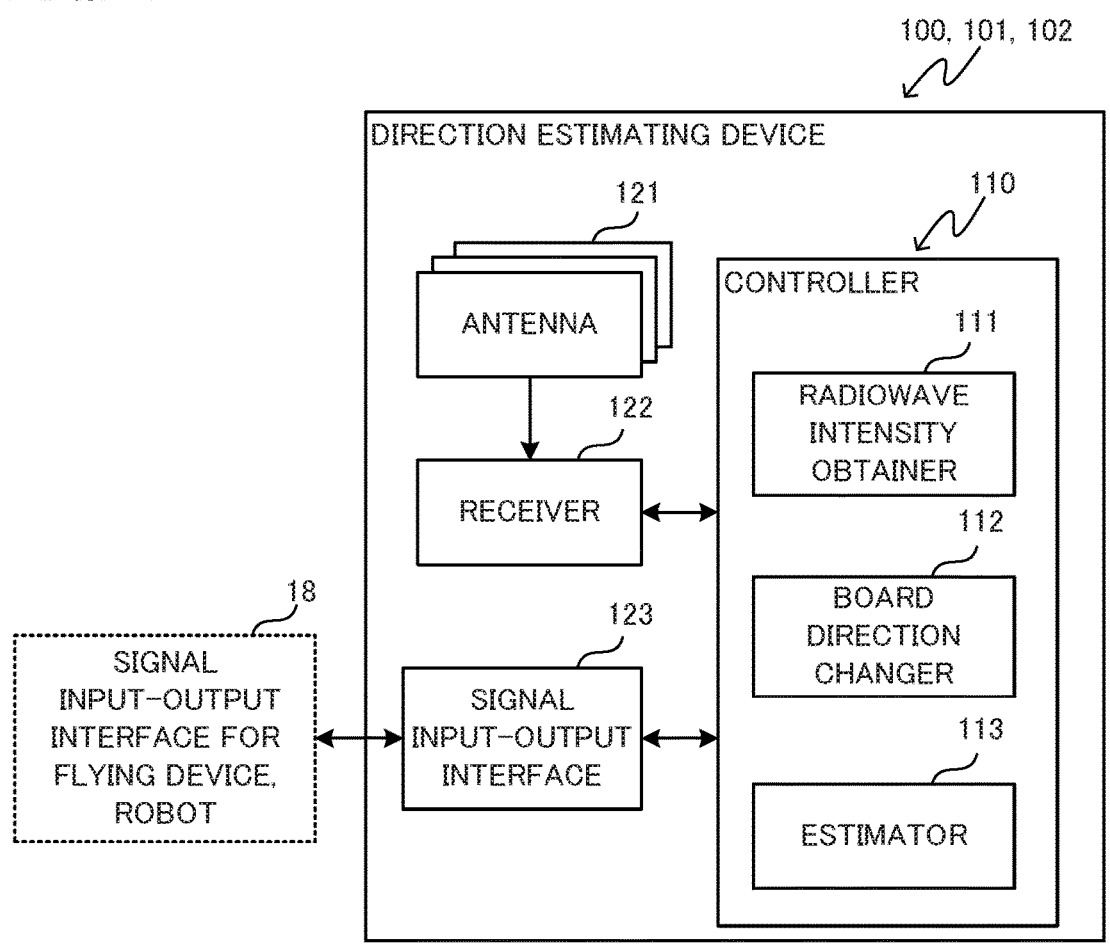
FIG. 4 is a block diagram illustrating a functional structure of a direction estimating device according to Embodiment 1.

The functional structure of the flying device 10 has been described. Next, a functional structure of the direction estimating device 100 is described. As illustrated in FIG. 4, the direction estimating device 100 includes a controller 110, multiple antennas 121, a receiver 122, and a signal input-output interface 123.

The controller 110 includes a central processing unit (CPU), a read-only memory (ROM), a random-access memory (RAM), and the like, and controls the entire actions of the direction estimating device 100. The CPU that is executing a program stored in the ROM accomplishes the functions of the respective components (a radiowave intensity obtainer 111, a board direction changer 112, and an estimator 113) of the controller 110.

The antenna 121 is an antenna that has a directivity. For example, a chip antenna provided with a reflector is applied. The direction estimating device 100 includes the multiple antennas 121 that have different main lobe directions as for the directivity.

The receiver 122 includes a radio frequency (RF) circuit, a base band (BB) circuit, and the like, and receives a radiowave transmitted by the terminal device 200. For example, the radiowaves are the radiowave of wireless local area network (LAN) and the radiowave of Bluetooth (Registered Trademark).

The signal input-output interface 123 is an interface that inputs and outputs a signal relative to the flying device 10. The signal input and output are performed between the signal input-output interface 123 of the direction estimating device 100 and the signal input-output interface 18 of the flying device 10. For example, the signal input-output interface 123 is capable of outputting a signal to control the motor 13 of the flying device 10. In addition, the direction estimating device 100 is capable of obtaining information detected by the sensor element of the flying device 10 via the signal input-output interface 123. When, for example, the direction estimating device 100 outputs, via the signal input-output interface 123, signals indicating "turning at the present location", "moving up", and "moving forward", the flying device 10 adjusts the rotation speeds of the four motors 13 to turn at the present location, move up, and move forward while hovering.

Next, a functional structure of the controller 110 of the direction estimating device 100 is described. The controller 110 includes, in view of the functions, the radiowave intensity obtainer 111, the board direction changer 112, and the estimator 113.

The radiowave intensity obtainer 111 obtains a received signal strength indication (RSSI) of a radiowave when the receiver 122 receives the radiowave received by each of the multiple antennas 121. The radiowave intensity obtainer 111 obtains the RSSI for each antenna.

The board direction changer 112 creates instruction signals, such as turning or moving up and down for the flying device 10, and outputs the instruction signals to the flying device 10 via the signal input-output interface 123, thereby changing a direction of a board or an altitude thereof. The signal created by the board direction changer 112 is output to the drive controller 16 of the flying device 10 via the signal input-output interface 123, and the flying device 10 turns or moves up and down, and thus the direction of the board of the direction estimating device 100 and the altitude thereof change Hence, the RSSI of the subsequent radiowave received by each antenna 121 changes.

The estimator 113 estimates the arriving direction of the radiowave (radiowave arriving direction) based on the RSSI obtained by the radiowave intensity obtainer 111. The board direction changer 112 changes the direction of the board or the altitude thereof based on the arriving direction estimated by the estimator 113.

Figure 5A:
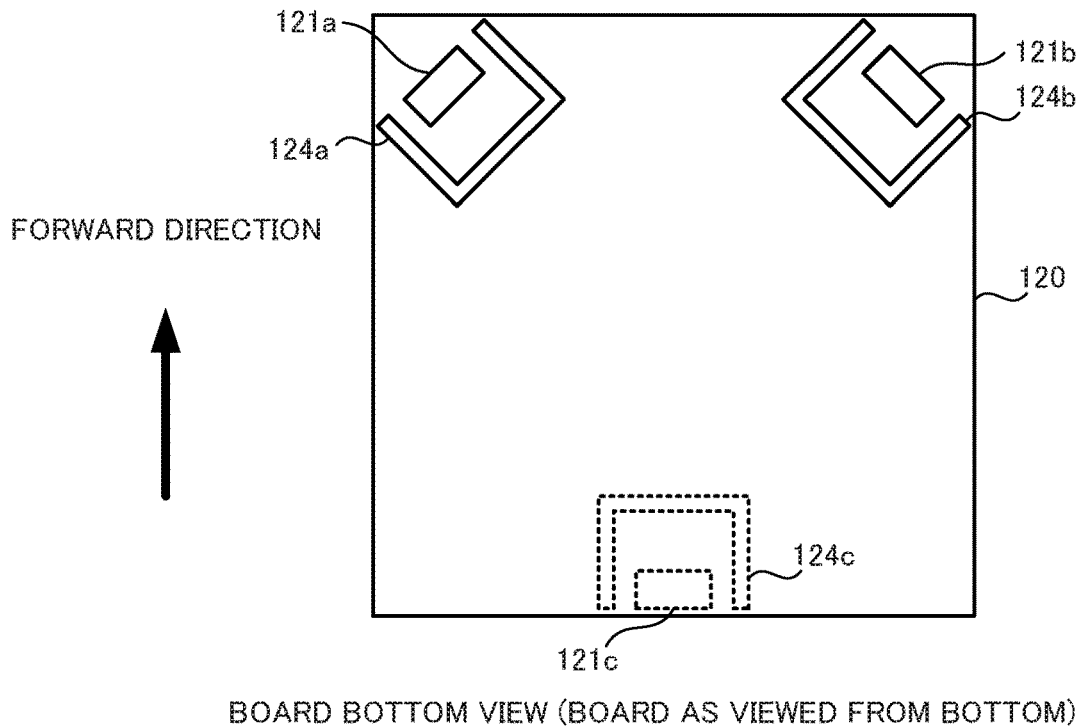
FIG. 5A is a bottom view of a board of the direction estimating device according to Embodiment 1.

The functional structure of the direction estimating device 100 has been described. Next, an antenna arrangement on the board of the direction estimating device 100 is described with reference to FIGS. 5A and 5B. As illustrated in FIG. 5A, the direction estimating device 100 includes an antenna 121a and an antenna 121b located at right and left sides of a bottom (a first surface) of the board 120 in the forward direction of the flying device 10. Reflectors 124a and 124b are provided near the respective antennas, and thus the main lobe direction of the directivity is shifted by 45 degrees to the right and the left in the forward direction of the flying device 10. The estimator 113 estimates the radiowave arriving direction as for the parallel direction to the plane of the board 120 based on the RSSI of the radiowave received by each of the two antennas. In the following description, the direction parallel to the plane of the board 120 may be also referred to as a horizontal direction. The antenna 121a, the reflector 124a, the antenna 121b, and the reflector 124b may be placed in a manner in contact with the bottom (the first surface) of the board 120, or may be placed so as to be apart therefrom.

Figure 5B:
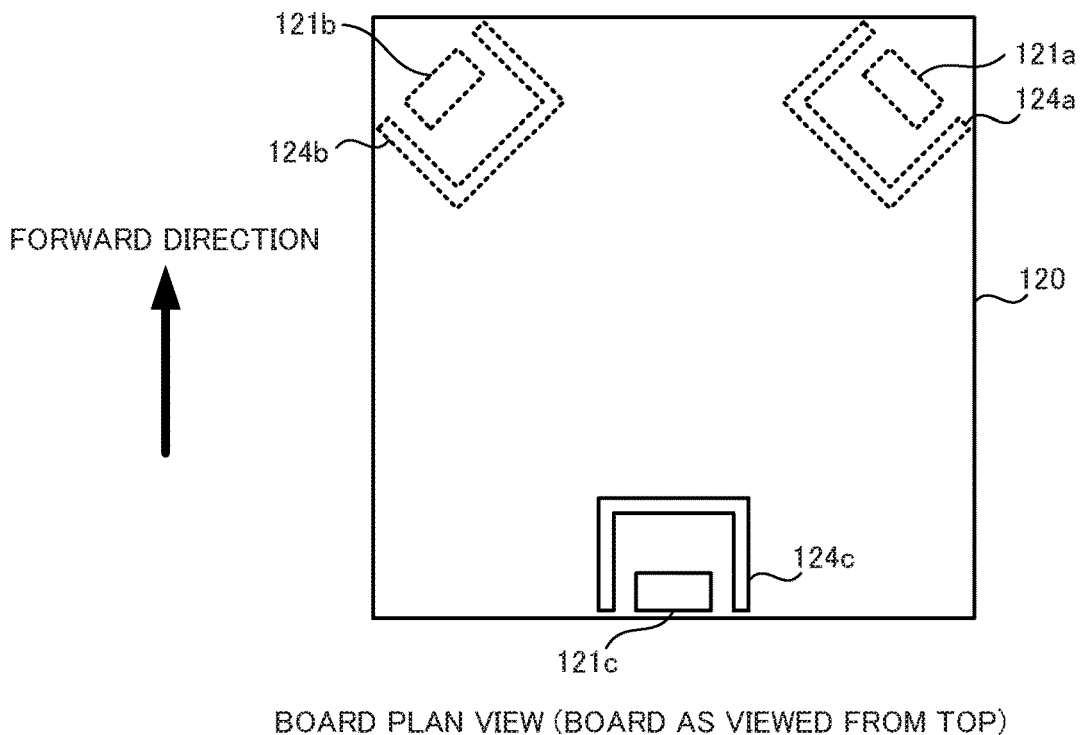
FIG. 5B is a plan view of the board of the direction estimating device according to Embodiment 1.

In addition, as illustrated in FIG. 5B, the direction estimating device 10 includes an antenna 121c and a reflector 124c at the center of an upper surface (a back surface to the bottom, a second surface) of the board 120 in a backward direction (an opposite direction to the forward direction) of the flying device 10. The estimator 113 estimates the radiowave arriving direction based on the RSSI of the radiowave received by each of the antenna 121c on the upper surface and the two antennas on the bottom as for the perpendicular direction to the plane of the board 120. In the following description, the direction perpendicular to the plane of the board 120 may be also referred to as a vertical direction. In addition, when the antennas 121a to 121c are collectively referred, the term antenna 121 is given, and when the reflectors 124a to 124c are collectively referred, the term reflector 124 is given. The antenna 121c and the reflector 124c may be placed in a manner in contact with the upper surface (the opposite surface to the bottom, the second surface) of the board 120, or may be placed so as to be apart therefrom.

FIG. 5A is a bottom view when the board 120 is viewed from a downward direction, and since the antenna 121c and the reflector 124c are placed on the upper surface (the back surface to the bottom, the second surface), those are indicated by dashed lines. In addition, FIG. 5B is a top view when the board 120 is viewed from an upward direction, and since the antenna 121a, the reflector 124a, the antenna 121b, and the reflector 124b are placed on the bottom (the first surface), those are indicated by dashed lines.

Figure 6:
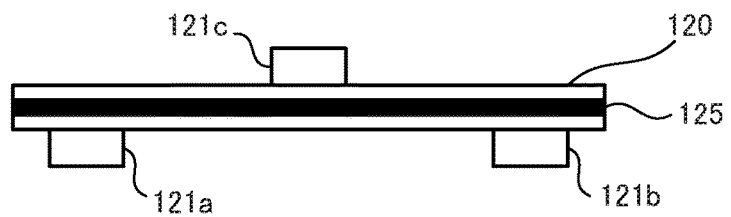
FIG. 6 is a cross-sectional view illustrating an internal structure of the board of the direction estimating device according to Embodiment 1.

As illustrated in FIG. 6, the board 120 has a ground plane 125 located in a middle section in a thickness direction of the board 120. The ground plane 125 is a shield that shields the radiowave, and prevents the radiowave arriving from the backward side of the plane of the board 120 on which the antenna 121 is placed from received by the antenna 121.

Figure 7:
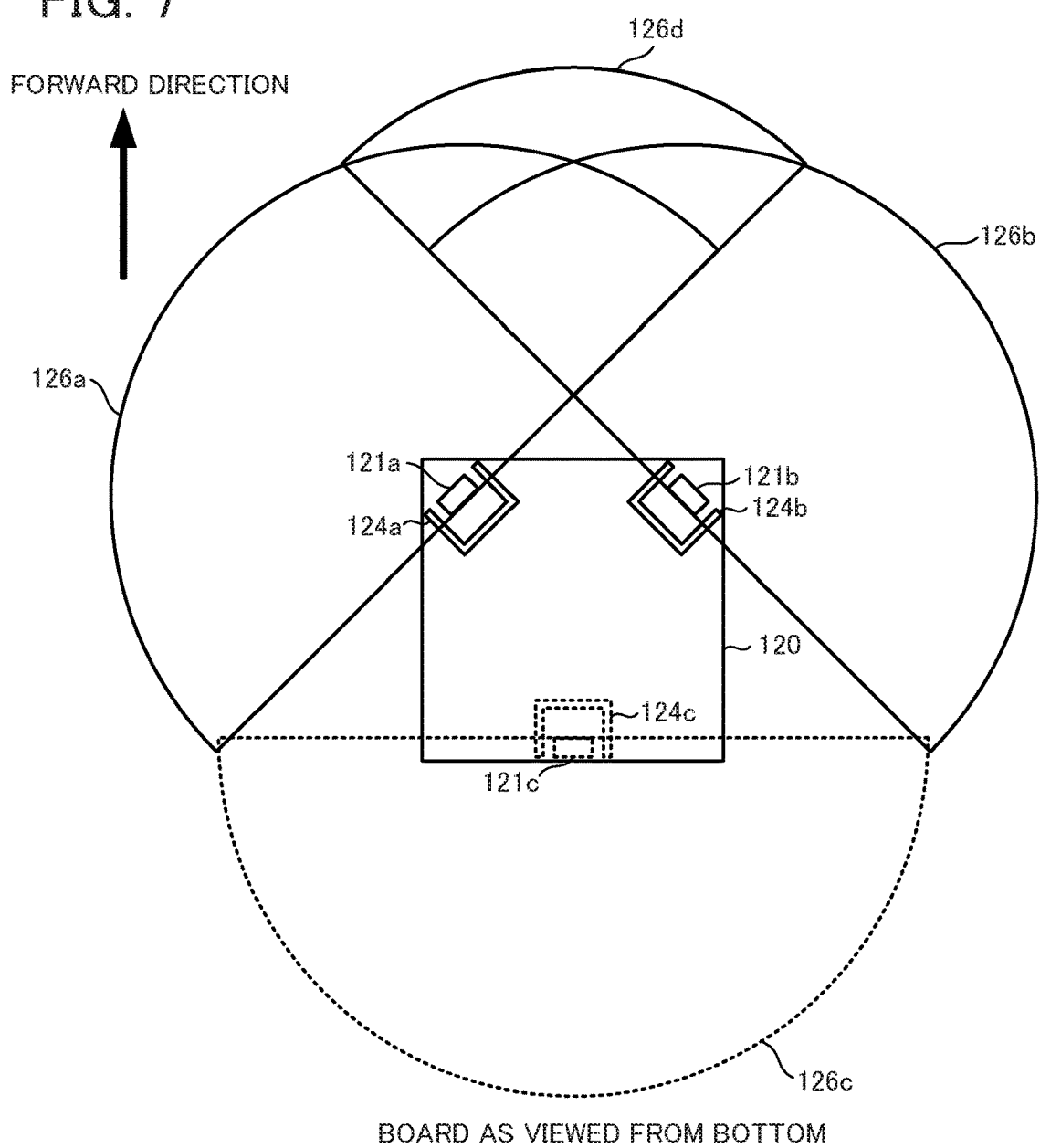
FIG. 7 is a diagram illustrating a directivity of an antenna of the direction estimating device according to Embodiment 1.

Next, the directivity of the antenna of the direction estimating device 100 is described. As illustrated in FIG. 7, a directivity 126a of the antenna 121a has the main lobe that is directed in the left direction 45 degrees shifted from the forward direction of the flying device 10. Likewise, as illustrated in FIG. 7, a directivity 126b of the antenna 121b has the main lobe that is directed in the right direction 45 degrees shifted from the forward direction of the flying device 10. Moreover, a directivity 126c of the antenna 121c has the main lobe directed in the opposite direction to the forward direction of the flying device 10. An overlap region 126d of the directivity having the radiowave received by both the antenna 121a and the antenna 121b is directed in the forward direction. An open angle of the overlap region 126d of the directivity may be adjusted by adjusting the respective angles of the antenna 121a and the antenna 121b.

In FIG. 7, since the antenna 121a and the antenna 121b are shifted by 45 degrees to the right and the left from the forward direction, the open angle of the overlap region 126d of the directivity is 90 degrees. This is because since the open angle of the directivity of each antenna is 180 degrees, the former open angle can be obtained based on 180−45−45=90. When, for example, the respective angles of the antenna 121a and 121b are shifted by 60 degrees to the right and the left from the forward direction, the open angle of the overlap region 126d of the directivity becomes 60 degrees based on 180−60−60=60. When this open angle is reduced, with respect to an estimation of the radiowave arriving direction, the precision of the angle estimation in the horizontal direction improves. Conversely, receiving of the radiowave from the forward direction becomes slightly difficult. Hence, based on the magnitude of the radiowave to be transmitted by the terminal device 200 and the necessary precision for the direction estimating device 100, what open angle is applied is determined. In general, as illustrated in FIG. 7, the open angle may be set to 90 degrees.

In addition, as for the directivity in the vertical direction, by the ground plane 125, the directivity 126a of the antenna 121a and the directivity 126b of the antenna 121b are directed downwardly relative to the board 120, and the directivity 126c of the antenna 121c is directed upwardly relative to the board 120. In FIG. 7, dashed lines indicate that the directivity 126c of the antenna 121c in the vertical direction is directed upwardly relative to the board 120.

Figure 8:
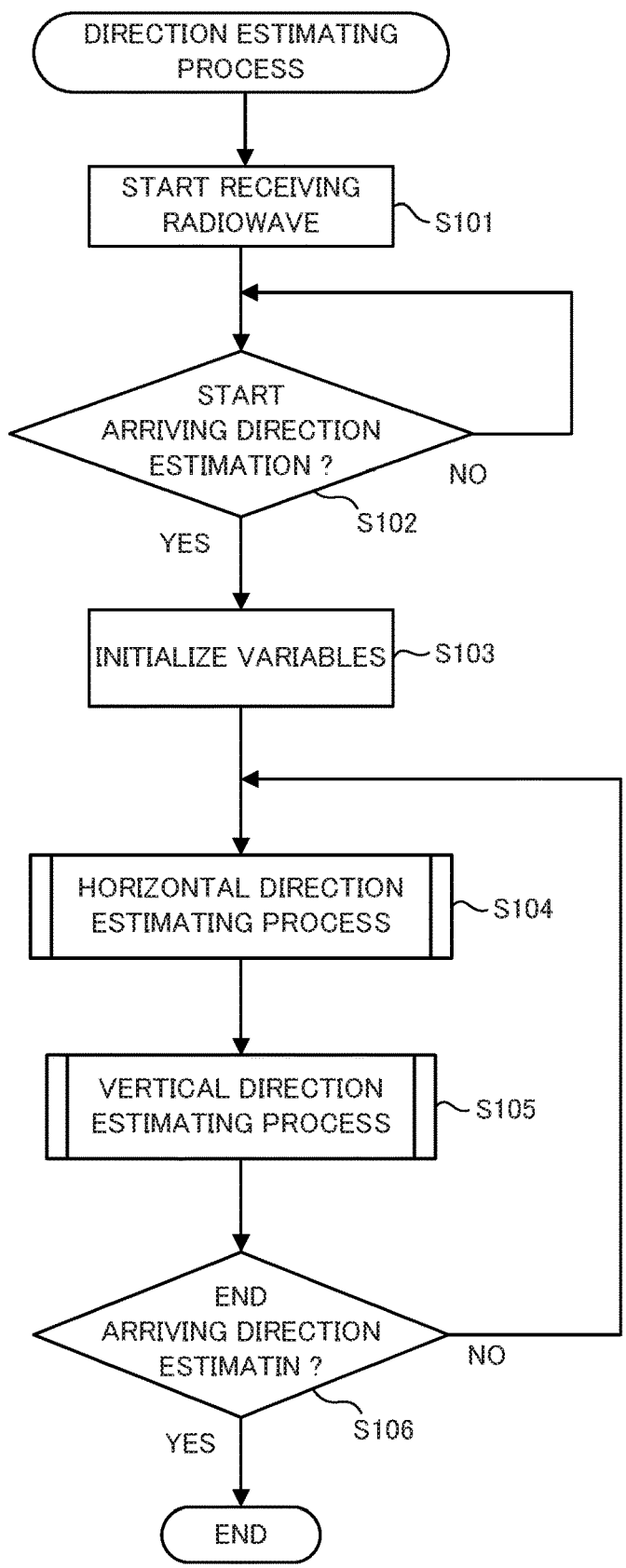
FIG. 8 is a flowchart illustrating a direction estimating process according to Embodiment 1.

A direction estimating process by the direction estimating device 100 to estimate the radiowave arriving direction by utilizing such a directivity of each antenna 121 is described with reference to FIG. 8. First, the controller 110 of the direction estimating device 100 starts receiving the radiowave being transmitted by the terminal device 200 via the antenna 121 and the receiver 122 (step S101). In this case, there is a necessity such that no radiowave is received from other than the terminal device 200, and only the radiowave from the terminal device 200 is received. Hence, the direction estimating device 100 stores the identification (ID) of the terminal device 200 beforehand. Next, in the step S101, the radiowave received by the receiver 122 is demodulated, and a selection of a channel, and like, is repeated until the ID contained in the demodulation result matches the ID of the terminal device 200. For example, the ID in this case is a media access control (MAC) address.

Next, the controller 110 determines whether or not to start the estimation of the radiowave arriving direction (step S102). This is to determine whether or not, for example, a trigger to start the estimation of the radiowave arriving direction is given such as whether or not the sensor 17 detects that the user throws the flying device 10. When the trigger to start the estimation of the arriving direction is not given (step S102: NO), the process returns to the step S102. When the trigger to start the estimation of the arriving direction is given (step S102: YES), the controller 110 initializes various variables (step S103).

Subsequently, the estimator 113 performs a horizontal direction estimating process (step S104), and then performs a vertical direction estimating process (step S105). The details of the horizontal direction estimating process and those of the vertical direction estimating process are described later. Next, the controller 110 determines whether or not to end the estimation of the radiowave arriving direction (step S106). This is to determine whether or not, for example, a trigger to end the estimation of the radiowave arriving direction is given such that whether or not the sensor 17 detects that the flying device 10 returns to the user's hand. When the trigger to end the estimation of the arriving direction is not given (step S106: NO), the process returns to the step S104. When the trigger to end the estimation of the arriving direction is given (step S106: YES), the direction estimating process is completed.

Figure 9:
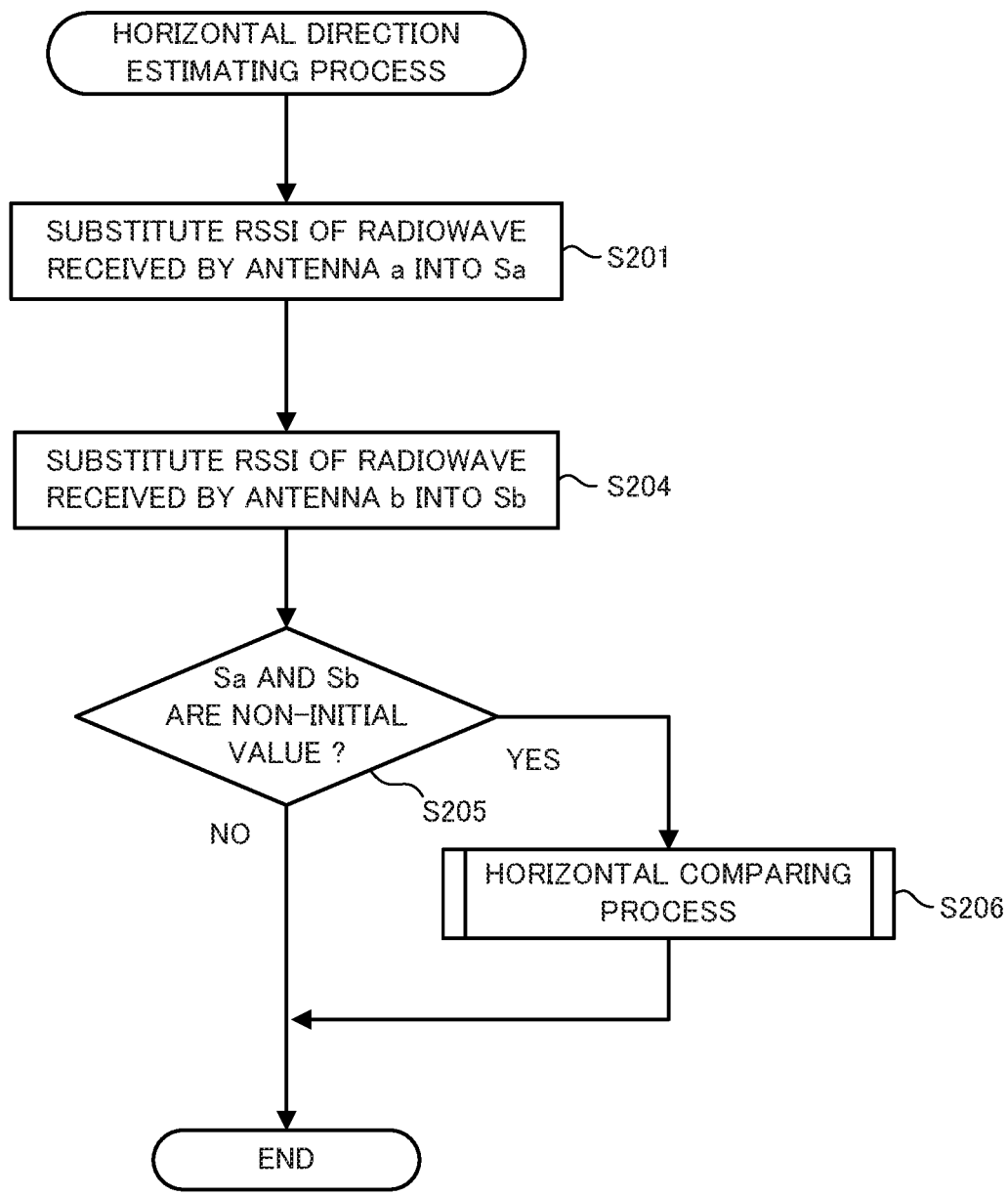
FIG. 9 is a flowchart illustrating a horizontal direction estimating process according to Embodiment 1.

Next, the horizontal direction estimating process performed in the step S104 is described with reference to FIG. 9. In order to simplify the denotation, in the figures subsequent to FIG. 9, the antenna 121a, the antenna 121b, and the antenna 121c are referred to as the antenna a, the antenna b, and the antenna c, respectively.

First, the radiowave intensity obtainer 111 substitutes the RSSI of the radiowave when the receiver 122 receives the radiowave received by the antenna 121a into a variable Sa (step S201). Next, the radiowave intensity obtainer 111 substitutes the RSSI of the radiowave when the receiver 122 receives the radiowave received by the antenna 121b into a variable Sb (step S204).

Subsequently, the estimator 113 determines whether or not both the variable Sa and the variable Sb are a non-initial value (step S205). When both the variable Sa and the variable Sb are the non-initial value (step S205: YES), the estimator 113 performs a horizontal comparing process (step S206), and ends the horizontal direction estimating process. When the variable Sa or the variable Sb is the initial value (step S205: NO), the estimator 113 ends the horizontal direction estimating process.

Next, the horizontal comparing process performed in the step S206 is described with reference to FIG. 10. In this process, two types of thresholds are applied. The first threshold is a threshold Th to determine whether or not the radiowave is receivable. When the RSSI is less than the threshold Th, the estimator 113 determines that the radiowave from the terminal device 200 is receivable. The second threshold is a threshold ThD to determine whether or not the RSSI Ra of the radiowave received by the antenna 121a and the RSSI Rb of the radiowave received by the antenna 121b are substantially consistent values. When the absolute value of the difference between Sa and Sb is less than the threshold ThD, the estimator 113 determines that Sa and Sb are substantially consistent values. In this case, the direction estimating device 100 estimates that the radiowave transmitted from the terminal device 200 is arriving from the direction of the overlap region 126d of the directivity illustrated in FIG. 7.

Figure 10:
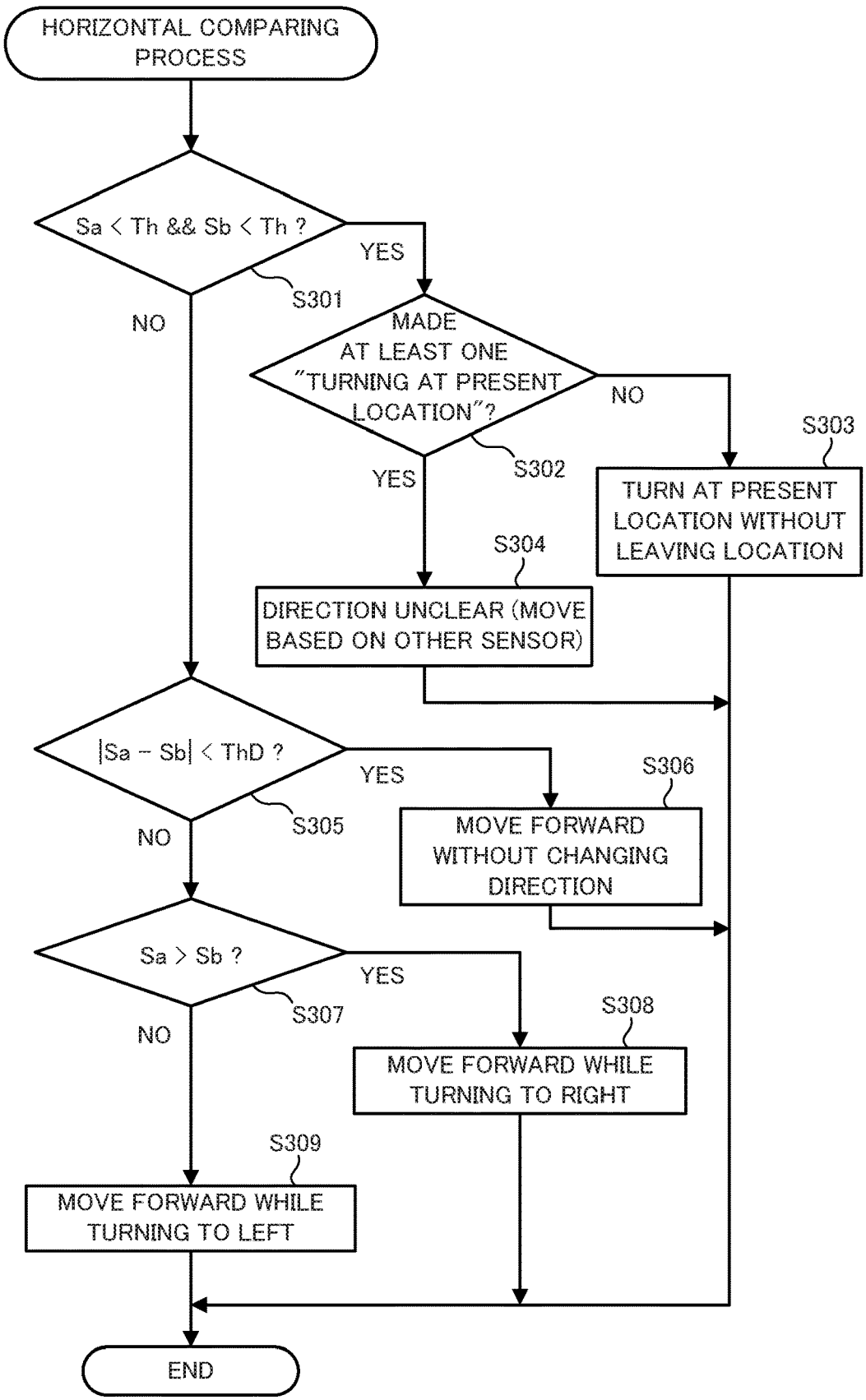
FIG. 10 is a flowchart illustrating a horizontal comparing process according to Embodiment 1.

The horizontal comparing process illustrated in FIG. 10 is described. First, the estimator 113 determines whether or not Sa<Th and Sb<Th (step S301). When Sa<Th and Sb<Th (step S301: YES), the estimator 113 determines whether or not the "turning at the present location" that starts in a following step S303 has been made by at least one time (step S302). When one turning has not been made yet (step S302: NO), the board direction changer 112 outputs, to the drive controller 16 of the flying device 10 via the signal input-output interface 123, an instruction to turn at the present location without leaving the location (step S303), and ends the horizontal comparing process.

When at least one "turning at the present location" has been made (step S302: YES), the estimator 113 determines that the radiowave arriving direction is unclear, and determines the flying direction based on the information from the sensor 17 (step S304). Next, the horizontal comparing process is completed. How many times the "turning at the present location" has been made can be determined by the estimator 113 that obtains, via the signal input-output interface 123, the information from the gyroscope sensor in the sensor 17 of the flying device 10. In addition, the determination in the step S302 may be, for example, "equal to or greater than five turnings" instead of "at least one turning", and the "turning at the present location" may be repeated by several times under a circumstance at which the radiowave from the terminal device 200 is not receivable.

When Sa≥Th or Sb≥Th (step S301: NO), the estimator 113 determines whether or not the absolute value of the difference between Sa and Sb is less than ThD (step S305). When the absolute value of the difference between Sa and Sb is less than ThD (step S305: YES), the estimator 113 estimates that the radiowave arriving direction is the forward direction of the flying device 10. Next, the board direction changer 112 outputs, to the drive controller 16 of the flying device 10 via the signal input-output interface 123, an instruction to move forward without changing the direction (step S306). Subsequently, the horizontal comparing process is completed.

When the absolute value of the difference between Sa and Sb is equal to or greater than ThD (step S305: NO), the estimator 113 determines whether or not Sa>Sb (step S307). When Sa>Sb (step S307: YES), the estimator 113 estimates that the radiowave arriving direction is the rightward direction relative to the forward direction of the flying device 10. Next, the board direction changer 112 outputs, to the drive controller 16 of the flying device 10 via the signal input-output interface 123, an instruction to move the flying device 10 forward while turning to the right (step S308), and ends the horizontal comparing process. When the flying device 10 turns to the right, the board 120 of the direction estimating device 100 turns counterclockwise toward the bottom, and thus the overlap region 126d of the directivity is directed to the radiowave arriving direction estimated by the estimator 113.

When Sa<Sb (step S307: NO), the estimator 113 estimates that the radiowave arriving direction is the leftward direction relative to the forward direction of the flying device 10. Next, the board direction changer 112 outputs, to the drive controller 16 of the flying device 10 via the signal input-output interface 123, an instruction to move the flying device 10 forward while turning to the left (step S309), and ends the horizontal comparing process. When the flying device 10 turns to the left, the board 120 of the direction estimating device 100 turns clockwise toward the bottom, and thus the overlap region 126d of the directivity is directed to the radiowave arriving direction estimated by the estimator 113.

By the above described horizontal direction estimating process and horizontal comparing process, the board direction changer 112 controls the turning of the flying device 10 in such a way that the radiowave transmitted from the terminal device 200 is receivable within the overlap region 126d of the directivity illustrated in FIG. 7. Next, the vertical direction estimating process performed in the step S105 in FIG. 8 is described with reference to FIG. 11. In this case, a predetermined angle to tilt in the vertical direction is defined as α. In practice, α is set to be, for example, 10 degrees.

Figure 11:
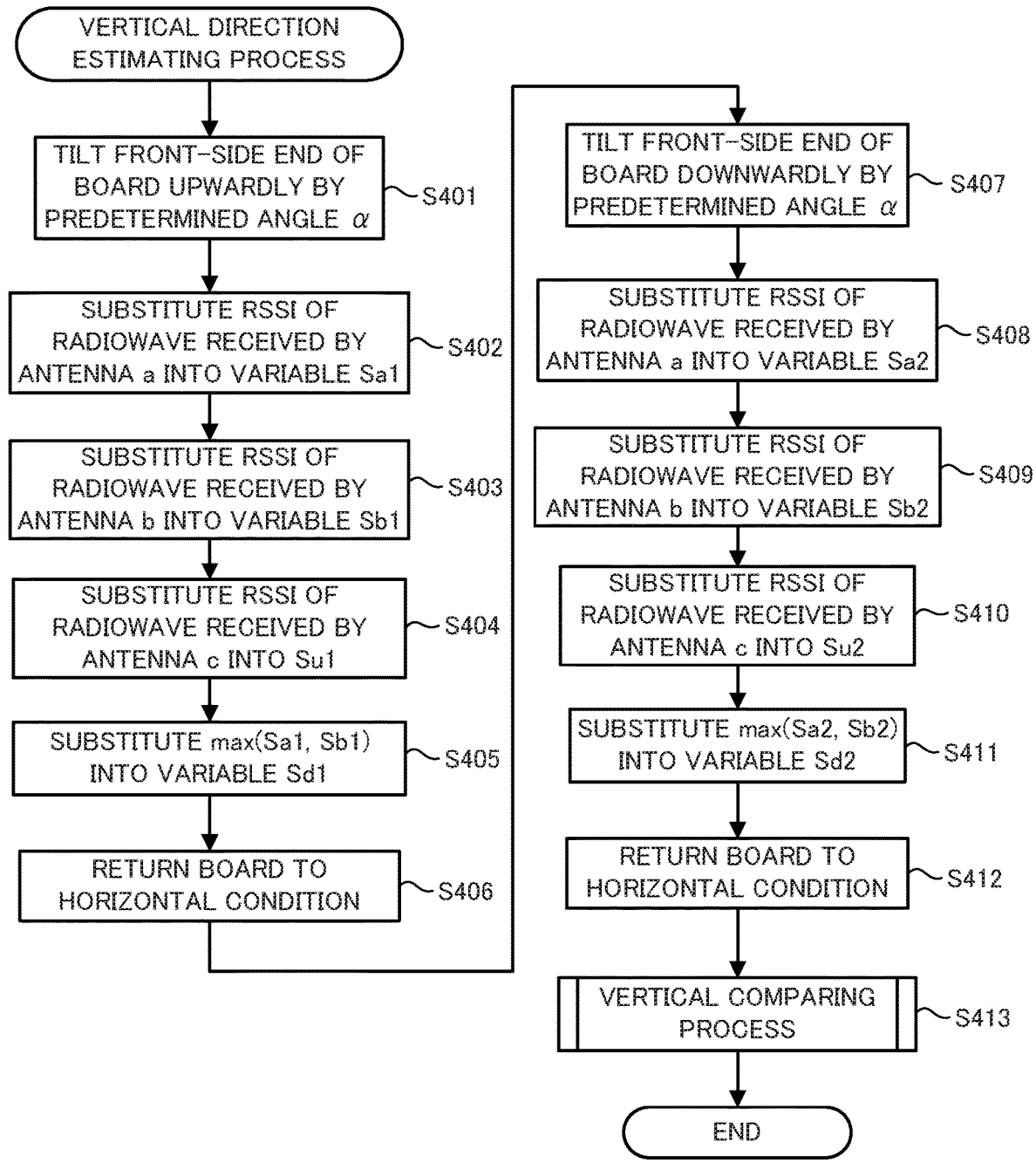
FIG. 11 is a flowchart illustrating a vertical direction estimating process according to Embodiment 1.

The vertical direction estimating process illustrated in FIG. 11 is described. First, the board direction changer 112 outputs, to the drive controller 16 of the flying device 10 via the signal input-output interface 123, an instruction to tilt the end of the board 120 of the direction estimating device 100 in the forward direction of the flying device 10 upwardly by α using, as an axis, a straight line that causes a plane perpendicular to a straight line extending in the forward direction of the flying device 10 to pass through the center point of the board 120 and to intersect therewith (step S401). Next, the radiowave intensity obtainer 111 substitutes the RSSI of the radiowave when the receiver 122 receives the radiowave received by the antenna 121a into a variable Sa1 (step S402). Subsequently, the radiowave intensity obtainer 111 substitutes the RSSI of the radiowave when the receiver 122 receives the radiowave received by the antenna 121b into a variable Sb1 (step S403).

Next, the radiowave intensity obtainer 111 substitutes the RSSI of the radiowave when the receiver 122 receives the radiowave received by the antenna 121c into a variable Su1 (step S404). Subsequently, the radiowave intensity obtainer 111 substitutes either the greater one of Sa1 and Sb1 into a variable Sd1 (step S405). Next, the board direction changer 112 outputs, to the drive controller 16 of the flying device 10 via the signal input-output interface 123, an instruction to return the board 120 of the direction estimating device 100 to be the horizontal condition (step S406). Even if the flying device 10 does not return the tilting condition to the horizontal condition, when the process in the step S407 is executable, the process in the step S406 can be omitted.

Next, the board direction changer 112 outputs, to the drive controller 16 of the flying device 10 via the signal input-output interface 123, an instruction to tilt the end of the board 120 of the direction estimating device 100 in the forward direction of the flying device 10 downwardly by α using, as an axis, the straight line that causes the perpendicular plane to the straight line extending in the forward direction of the flying device 10 to pass through the center point of the board 120 and intersect therewith (step S407). Subsequently, the radiowave intensity obtainer 111 substitutes the RSSI of the radiowave when the receiver 122 receives the radiowave received by the antenna 121a into a variable Sa2 (step S408). Next, the radiowave intensity obtainer 111 substitutes the RSSI of the radiowave when the receiver 122 receives the radiowave received by the antenna 121b into a variable Sb2 (step S409).

Next, the radiowave intensity obtainer 111 substitutes the RSSI of the radiowave when the receiver 122 receives the radiowave received by the antenna 121c into a variable Su2 (step S410). Subsequently, the radiowave intensity obtainer 111 substitutes either the greater one of Sa2 and Sb2 into a variable Sd2 (step S411). Next, the board direction changer 112 outputs, to the drive controller 16 of the flying device 10 via the signal input-output interface 123, an instruction to return the board 120 of the direction estimating device 100 to be the horizontal condition (step S412). Next, the estimator 113 performs a vertical comparing process (step S413), and ends the vertical direction estimating process. The details of the vertical comparing process are described later.

Through the above process, the RSSI of the radiowave from the downward direction of the board when the forward side of the board is tilted upwardly by α is substituted in Sd1. At this time, the backward side of the board is tilted downwardly by α, and the RSSI of the radiowave from the upward direction of the board is substituted in Su1. In addition, the RSSI of the radiowave from the downward direction of the board when the forward side of the board is tilted downwardly by α is substituted in Sd2. At this time, the backward side of the board is tilted upwardly by α, and the RSSI of the radiowave from the upward direction of the board at this time is substituted in Su2.

Next, the vertical comparing process performed in the step S413 is described with reference to FIG. 12. In this process, a different threshold ThD2 from the former thresholds is applied. This threshold ThD2 is to determine whether or not an RSSI S1 when the forward side of the board is tilted upwardly and an RSSI S2 when the forward side of the board is tilted downwardly are substantially consistent values. When the absolute value of the difference between S1 and S2 is less than ThD2, the estimator 113 determines that S1 and S2 are substantially consistent values. In this case, the estimator 113 estimates that the radiowave transmitted from the terminal device 200 is arriving from the substantially consistent altitude with the present altitude of the flying device 10.

Figure 12:
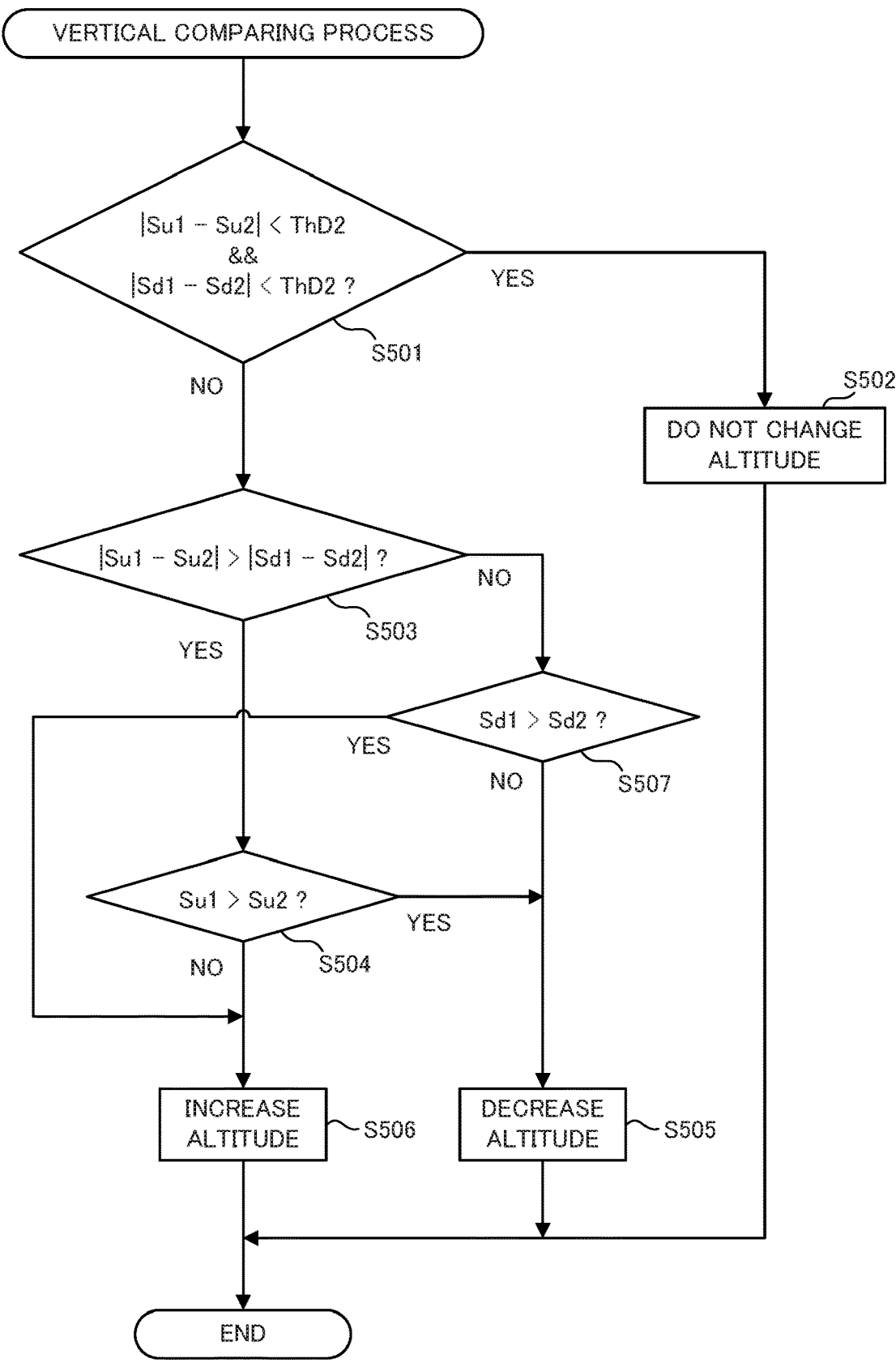
FIG. 12 is a flowchart illustrating a vertical comparing process according to Embodiment 1.

The vertical comparing process illustrated in FIG. 12 is described. First, the estimator 113 determines whether or not the absolute value of the difference between Su1 and Su2 is less than ThD2 and the absolute value of the difference between Sd1 and Sd2 is also less than ThD2 (step S501). When the absolute value of the difference between Su1 and Su2 is less than ThD2 and the absolute value of the difference between Sd1 and Sd2 is less than ThD2 (step S501: YES), the estimator 113 estimates that the radiowave transmitted from the terminal device 200 is arriving from the substantially consistent altitude with the present altitude of the flying device 10. Next, the board direction changer 112 outputs, to the drive controller 16 of the flying device 10 via the signal input-output interface 123, an instruction not to change the altitude of the flying device 10 (step S502), and ends the vertical comparing process. When the signal input-output interface 123 does not output an instruction, and when the flying device 10 does not change the flying altitude, the process in the step S502 may be omitted, and the vertical comparing process may be completed immediately.

When the absolute value of the difference between Su1 and Su2 is equal to or greater than ThD2 or when the absolute value of the difference between Sd1 and Sd2 is equal to or greater than ThD2 (step S501: NO), the estimator 113 determines whether or not the absolute value of the difference between Su1 and Su2 is greater than the absolute value of the difference between Sd1 and Sd2 (step S503). When the absolute value of the difference between Su1 and Su2 is greater than the absolute value of the difference between Sd1 and Sd2 (step S503: YES), the estimator 113 determines whether or not Su1>Su2 (step S504). When Su1>Su2 (step S504: YES), this indicates that the RSSI when the backward side is tilted downwardly is greater than the RSSI when the backward side is tilted upwardly, and thus the estimator 113 estimates that the radiowave arriving direction is the downward direction. Next, the board direction changer 112 outputs, to the drive controller 16 of the flying device 10 via the signal input-output interface 123, an instruction to decrease the altitude of the flying device 10 (step S505), and ends the vertical comparing process.

When Su1<Su2 (step S504: NO), this indicates that the RSSI when the backward side is tilted downwardly is less than the RSSI when the backward side is tilted upwardly. Hence, the estimator 113 estimates that the radiowave arriving direction is the upward direction, and the board direction changer 112 outputs, to the drive controller 16 of the flying device 10 via the signal input-output interface 123, an instruction to increase the altitude of the flying device 10 (step S506), and ends the vertical comparing process.

When the absolute value of the difference between Su1 and Su2 is equal to or less than the absolute value of the difference between Sd1 and Sd2 (step S503: NO), the estimator 113 determines that whether or not Sd1>Sd2 (step S507). When Sd1>Sd2 (step S507: YES), this indicates that the RSSI when the forward side is tilted upwardly is greater than the RSSI when the forward side is tilted downwardly. Hence, the estimator 113 estimates that the radiowave arriving direction is the upward direction, and the board direction changer 112 outputs, to the drive controller 16 of the flying device 10 via the signal input-output interface 123, an instruction to increase the altitude of the flying device 10 (step S506), and ends the vertical comparing process.

When Sd1<Sd2 (step S507: NO), this indicates that the RSSI when the forward side is tilted upwardly is less than the RSSI when the forward side is tilted downwardly. Hence, the estimator 113 estimates that the radiowave arriving direction is the downward direction, and the board direction changer 112 outputs, to the drive controller 16 of the flying device 10 via the signal input-output interface 123, an instruction to decrease the altitude of the flying device 10 (step S505), and ends the vertical comparing process.

A desirable velocity v for the up-and-down movement relative to the altitude is set to be a value proportional to the magnitude of $\tan(\alpha)$, for example, $v=\tan(\alpha)\times 3$ m/s. In this case, when $\alpha=10$ degrees, the up-and-down movement velocity $v\cong 0.53$ m/s, and when $\alpha=20$ degrees, $v\cong 1.09$ m/s. By setting the up-and-down movement velocity v in this manner, even if the terminal device 200 is moving up and down at a fast speed, when $\alpha$ is set to be a large value, the flying device 10 is capable of tracking the terminal device 200. Conversely, if the terminal device 200 is moving up and down at a slow speed, when $\alpha$ is set to be a small value, the flying device 10 is capable of adjusting the altitude little by little, and thus the estimation of the altitude of the terminal device 200 becomes precise.

All processes relating to the direction estimating process are described above. Based on those processes, as for the horizontal direction, the estimator 113 is capable of estimating the radiowave arriving direction based on the overlap region 126d of the directivity between the antenna 121a and the antenna 121b illustrated in FIG. 7. Hence, by changing the open angle of this overlap region 126d of the directivity, the estimation precision as for the horizontal direction can be changed. In addition, as for the vertical direction, the estimator 113 is capable of estimating the radiowave arriving direction based on the difference in the RSSI between a case in which the forward side of the board 120 is tilted upwardly and a case in which such a forward side is tilted downwardly. Hence, the estimator 113 is capable of estimating not only the horizontal direction but also the vertical direction as for the radiowave arriving direction.

In addition, the direction of the overlap region 126d of the directivity between the antenna 121a and the antenna 121b and the direction of the directivity of the antenna 121c are in opposite directions. Hence, in the horizontal direction estimating process, even if the terminal device 200 is located at a dead zone for the directivity of the antenna 121a and that of the antenna 121b, in the vertical direction estimating process, the radiowave from the terminal device 200 can be received by the antenna 121c. Hence, the direction estimating device 100 moves the altitude up and down to the position of the terminal device 200, and thus in the subsequent horizontal direction estimating process, the radiowave from the terminal device 200 can be received by the antenna 121a or the antenna 121b.

In addition, the direction estimating device 100 obtains the RSSI while outputting an instruction for rotation and movement to the flying device 10, and estimates the radiowave arriving direction. Hence, even if the terminal device 200 is moving, the radiowave arriving direction can be estimated by tracking the terminal device 200.

In addition, since the antenna is a chip antenna provided with the reflector 124, the placement area can be reduced, and thus even if the multiple antennas 121 are placed, the direction estimating device 100 can be manufactured on the small board 120.

Still further, since the flying device 10 provided with the direction estimating device 100 includes the sensor 17 that has the imaging device and the recording device, the flying device 10 can be directed in the direction estimated by the direction estimating device 100, and capture an image by the imaging device and record sounds by the recording device. Moreover, by keep flying toward the direction estimated by the direction estimating device 100, the flying device 10 can come close to the terminal device 200. Hence, after the user who is carrying the terminal device 200 throws up the flying device 10, the flying device 10 can fly so as to return to the user while directing the imaging direction by the imaging device that is the camera and the main lobe direction of the directivity of the recording device that is the microphone being directed toward the user.

Modified Example of Embodiment 1

In the vertical direction estimating process of Embodiment 1, the estimator 113 estimates the radiowave arriving direction based on the difference in the RSSI between a case in which the forward side of the board 120 is tilted upwardly and a case in which such a forward side is tilted downwardly. However, since the board 120 includes the ground plane 125, even if the board 120 is not tilted, the estimator 113 is capable of estimating in which direction the radiowave arrives between the upward direction and the downward direction by comparing the RSSI of the respective radiowaves received by the antenna 121c placed on the upper surface, and the antennas 121a and 121b placed on the bottom. Such a modified example of Embodiment 1 is described.

According to the vertical direction estimating process according to the modified example of Embodiment 1, the vertical comparing process is performed after the steps S402 to S405 only and illustrated in FIG. 11 are executed. Next, according to the vertical comparing process in the modified example of Embodiment 1, Su1 and Sd1 are compared with each other. In this vertical comparing process, when the absolute value of the difference between Su1 and Sd1 is less than the threshold ThD, the estimator 113 estimates that the radiowave transmitted from the terminal device 200 arrives at the substantially consistent altitude with the present altitude of the flying device 10, and the board direction changer 112 does not change the altitude of the flying device 10. In addition, when Su1>Sd1, the estimator 113 estimates that the radiowave arrives from the downward direction, and the board direction changer 112 decreases the altitude of the flying device 10. Conversely, when Su1<Sd1, the estimator 113 estimates that the radiowave arrives from the upward direction, and the board direction changer 112 increases the altitude of the flying device 10.

According to the modified example of Embodiment 1 described above, the magnitude of the RSSI of the radiowave received by the antenna placed on the upper surface of the board and that of the radiowave received by the antenna placed on the bottom are compared with each other. Since the upper surface and the bottom are shielded against each other by the ground plane 125, regardless of whether the terminal device 20 is located above the direction estimating device 100 or below the direction estimating device 100, depending on the RSSI of the radiowave received by the antenna at either side, the direction estimating device 100 is capable of estimating whether the radiowave arriving direction is the upward direction or the downward direction.

Embodiment 2

According to Embodiment 1, the flying device 10 employs a structure provided with the direction estimating device 100. However, the present disclosure is not limited to the flying device 10, and any devices capable of moving can estimate the radiowave arriving direction and move toward the radiowave arriving direction by having the direction estimating device. In this case, Embodiment 2 in which a robot 20 is provided with a direction estimating device 101 is described.

As for a system structure of a direction estimating system 1001 according to Embodiment 2 of the present disclosure, the flying device 10 is replaced with the robot 20 in the direction estimating system 1000 according to Embodiment 1 illustrated in FIG. 1.

Figure 13A:
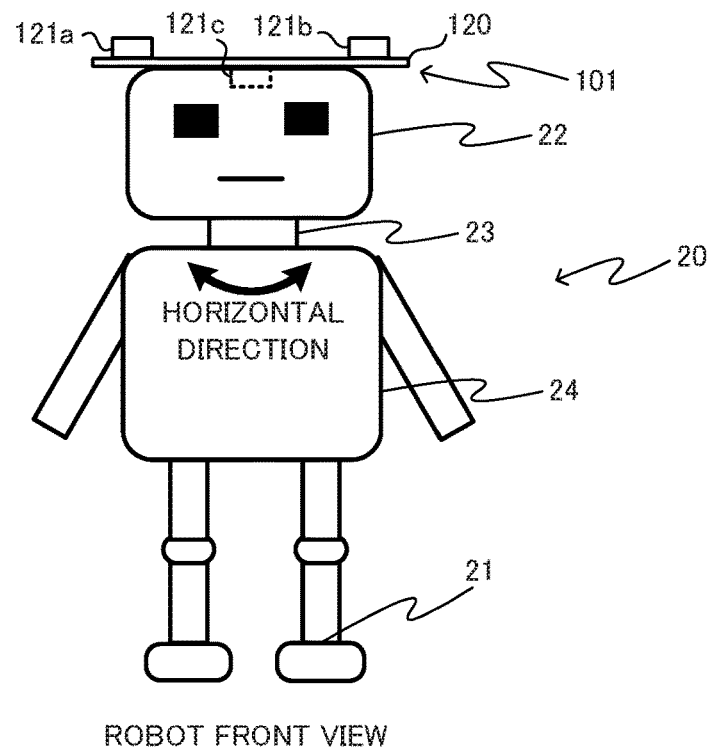
FIG. 13A is a front view of a robot according to Embodiment 2 of the present disclosure.
Figure 13B:
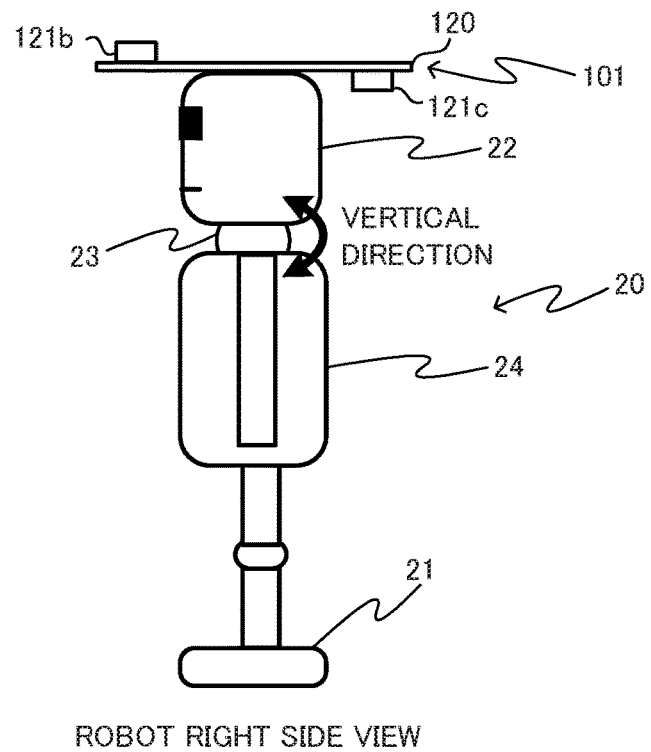
FIG. 13B is a right side view of the robot according to Embodiment 2.

FIGS. 13A and 13B are diagrams illustrating external appearances of the robot 20 according to Embodiment 2. FIG. 13A is a front view of the robot 20, while FIG. 13B is a right side view of the robot 20. The robot 20 includes legs 21, a head 22, a neck 23, and a body 24, and is capable of turning and moving by the legs 21. The direction estimating device 101 is provided at an upper part of the head 22. The neck 23 connects the head 22 with the body 24, and the head 23 is capable of turning the head 22 to the right and to the left, and tilting the head 22 up and down. When, however, the direction estimating device 101 can be turned and tilted by, for example, the legs 21, the neck 23 can be omitted. In addition, the legs 21 may be in a form capable of turning and moving using a motor instead of imitating the legs of a human.

A functional structure of the direction estimating device 101 according to Embodiment 2 is the same as that of the direction estimating device 100 according to Embodiment 1, and is illustrated in FIG. 3. However, the signal input-output interface 123 outputs a signal that controls not the flying device 10 but the robot 20. By outputting signals indicating "turning at the present location", "tilting the head upwardly", "moving forward", and the like, from the signal input-output interface 123, the robot 20 turns at the present location, tilts the head, moves forward, and the like, by the legs 21, and the like.

A functional structure of the robot 20 according to Embodiment 2 is also the same as that of the flying device 10 of Embodiment 1, and is illustrated in FIG. 4. However, the driver 15 drives the neck 23 of the robot 20 and the legs 21 thereof. By driving the driver 15, the robot 20 is capable of turning and tilting the head 22, and is capable of turning and moving by the legs 21.

The direction estimating device 101 illustrated in FIGS. 13A and 13B has a inversed placement relationship of the antenna 121 on the board of the direction estimating device 100 illustrated in FIGS. 5A and 5B between the upper surface and the bottom. The reason why this structure is employed is that, in the case of the flying device 10, the possibility that the radiowave from the terminal device 200 arrives from the downward direction of the direction estimating device 100 is high, but in the case of the robot 20, the possibility that the radiowave from the terminal device 200 arrives from the upward direction of the direction estimating device 101 is high. When the height of the robot 20 is shorter than the position of the terminal device 200, at the time of the radiowave horizontal direction estimation relative to a forward direction of the robot 20, as illustrated in FIGS. 13A and 13B, the antennas 121a and 121b are preferably placed on the upper part of the board 120. Even if those antennas are placed as described above, the horizontal direction estimating process by the direction estimating device 101 is the same process as that of the direction estimating device 100 illustrated in FIGS. 9 and 10.

Unlike the flying device 10, the robot 20 is not capable of moving up and down. However, by tilting the neck 23 up and down, an estimation of the vertical direction is enabled. This vertical direction estimating process by the robot 20 is described with reference to FIG. 14. In this case, a variable $\beta$ that indicates the tilting of the neck 23 of the robot 20 in the vertical direction is applied. The initial value is $\beta=0$, and in this case, the neck 23 is directed horizontally. When $\beta$ is a positive value, this indicates that the neck 23 is directed upwardly, and when $\beta$ is a negative value, this indicates that the neck 23 is directed downwardly. In addition, like Embodiment 1, in the vertical direction estimating process, a predetermined tilting angle in the vertical direction is indicated as $\alpha$ (for example, 10 degrees).

Figure 14:
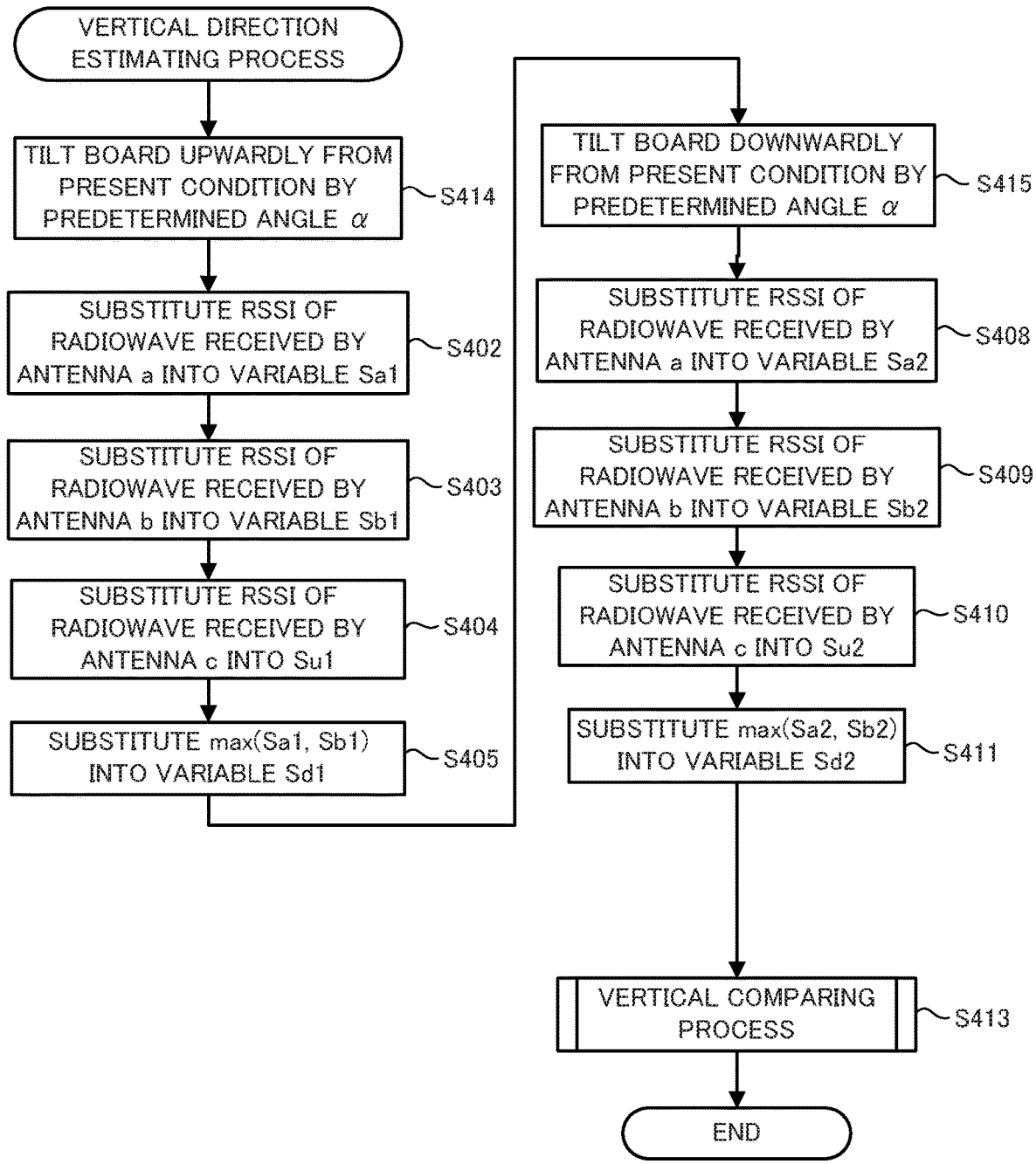
FIG. 14 is a flowchart illustrating a vertical direction estimating process according to Embodiment 2.

The vertical direction estimating process illustrated in FIG. 14 is described. This process is basically the same process as the vertical direction estimating process illustrated in FIG. 11 except several parts, and thus only the difference is described below. First, the board direction changer 112 outputs, to the drive controller 16 of the robot 20 via the signal input-output interface 123, an instruction to tilt the end of the board 120 of the direction estimating device 101 in the forward direction of the robot 20 upwardly by $\alpha$ from the present condition (step S414). The subsequent processes in the steps S402 to S405 are the same as the processes illustrated in FIG. 11.

Subsequent to the step S405, the board direction changer 112 outputs, to the drive controller 16 of the robot 20 via the signal input-output interface 123, an instruction to tilt the end of the board 120 of the direction estimating device 101 in the forward direction of the robot 20 downwardly by $\alpha$ from the present condition (step S415). The subsequent processes in the steps S408 to S411 are the same as those of the processes illustrated in FIG. 11. Next, without executing the process in the step S412 (the process of returning the board to the horizontal condition), the vertical comparing process is executed in the step S413, and the vertical direction estimating process is completed.

Figure 15:
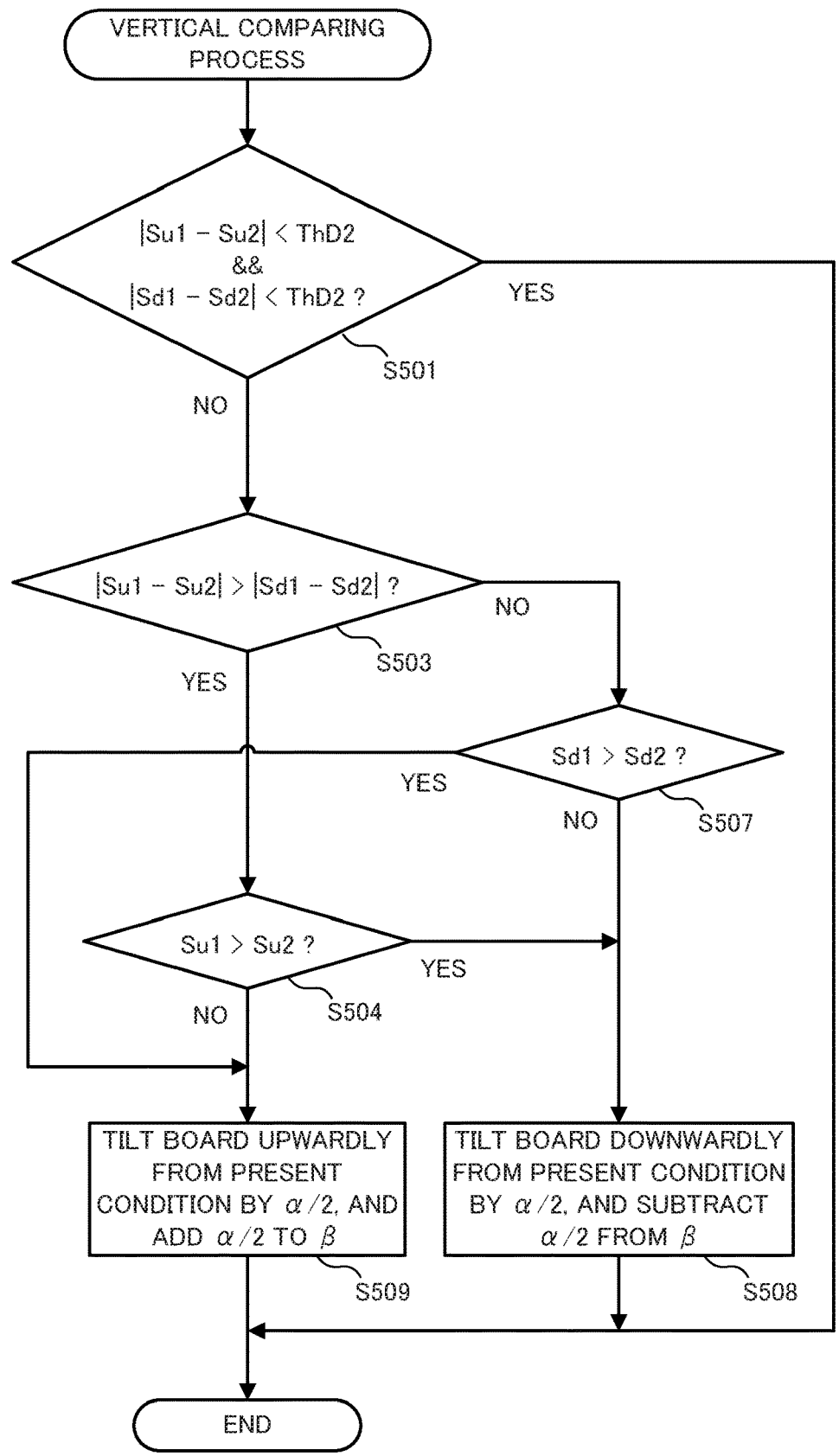
FIG. 15 is a flowchart illustrating a vertical comparing process according to Embodiment 2.

Next, the vertical comparing process by the robot 20 is described with reference to FIG. 15. This process is also the same process as the vertical comparing process illustrated in FIG. 12, and thus only the difference is described. First, the steps S501, S503, S504, and S507 are the same processes as those illustrated in FIG. 12. When the determination result in the step S501 is YES, without executing the process in the step S502 (not changing the altitude), the vertical comparing process is completed.

Subsequently, instead of the process in the step S505 (the process of decreasing the altitude), the estimator 113 estimates that the radiowave is arriving from the downward direction by α/2 relative to the present direction, and subtracts α/2 from β. Next, the board direction changer 112 outputs, to the drive controller 16 of the robot 20 via the signal input-output interface 123, an instruction to tilt the end of the board 120 in the forward direction of the robot 20 downwardly by α/2 from the present condition (step S508). In addition, instead of the process in the step S506 (the process of increasing the altitude), the estimator 113 estimates that the radiowave is arriving from the forward direction by α/2 relative to the present direction, and adds α/2 to β. Next, the board direction changer 112 outputs, to the drive controller 16 of the robot 20 via the signal input-output interface 123, an instruction to tilt the end of the board 120 in the forward direction of the robot 20 upwardly by α/2 from the present condition (step S509).

In accordance with the above processes, as for the vertical direction, the estimator 113 estimates the value of β so as to be directed in the radiowave arriving direction from the terminal device 200. Hence, when a user carries the terminal device 200 near a face of the user, the robot 20 can look up in the direction toward the user's face. In addition, since the robot 20 has the sensor 17 that includes the imaging device and the recording device, the robot 20 is capable of being directed in the direction estimated by the direction estimating device 101, capture an image by the imaging device and record sounds by the recording device. In addition, the robot 20 is capable of coming close to the terminal device 200 by continuously moving in the direction estimated by the direction estimating device 101. Accordingly, when the user who is carrying the terminal device 200 walks around and runs, the robot 20 is capable of moving so as to track the user with the imaging device that is the camera and the main lobe direction of the recording device that is the microphone being directed toward the user.

Embodiment 3

According to Embodiment 1 and Embodiment 2, the direction estimating devices 100, and 101 employ the structure having the three antennas 121, but the number of antennas is not limited to three. Embodiment 3 in which a dead zone for the radiowave is eliminated by providing a larger number of antennas 121 is described.

A system structure of a direction estimating system 1002 according to Embodiment 3 of the present disclosure is the same as that of the direction estimating system 1000 according to Embodiment 1 and illustrated in FIG. 1. A functional structure of a direction estimating device 102 according to Embodiment 3 is also the same as that of the direction estimating device 100 according to Embodiment 1 and illustrated in FIG. 3.

Figure 16A:
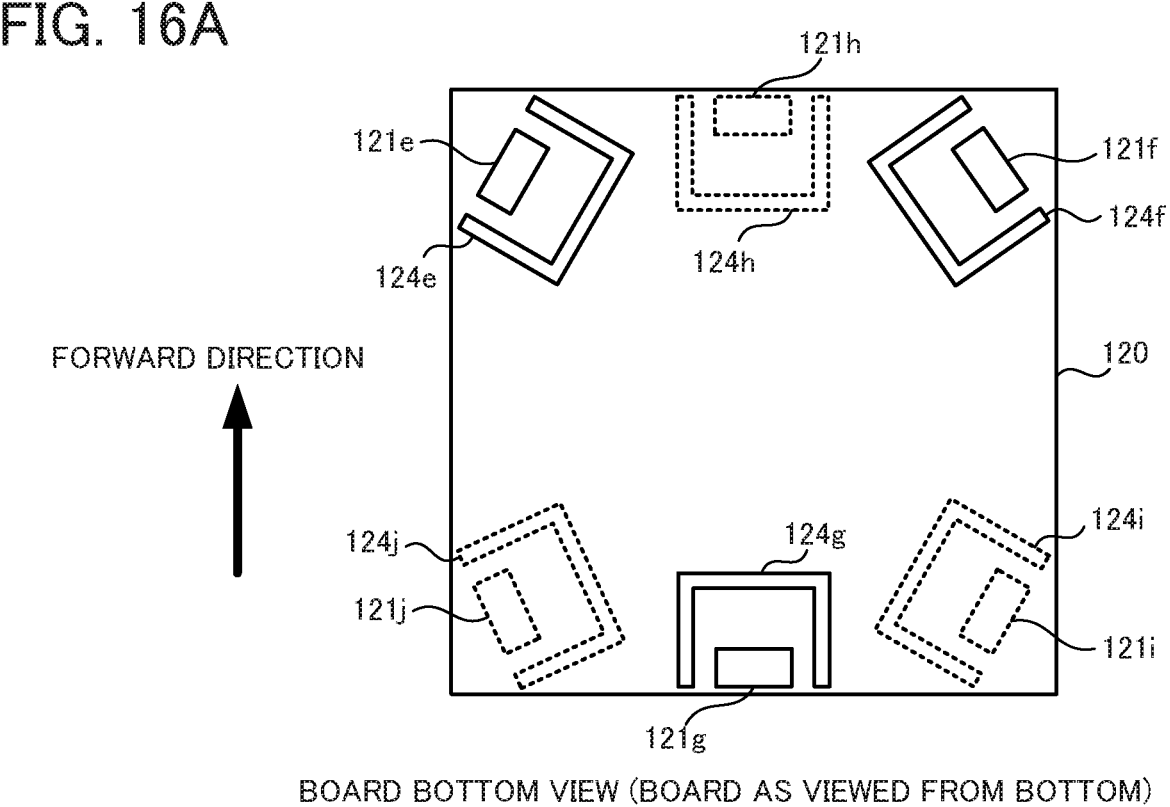
FIG. 16A is a bottom view of a board of a direction estimating device according to Embodiment 3 of the present disclosure.
Figure 16B:
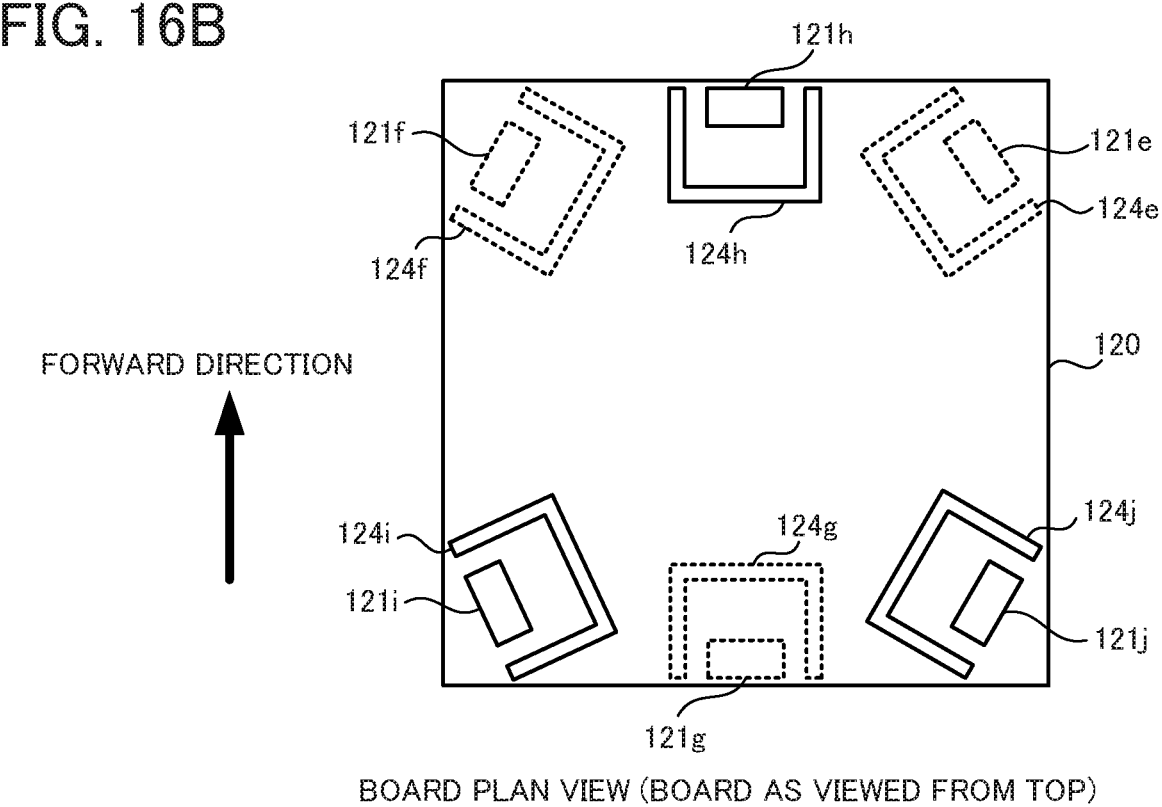
FIG. 16B is a plan view of the board of the direction estimating device according to Embodiment 3.

As for an antenna placement on a board of the direction estimating device 102 according to Embodiment 3, as illustrated in FIGS. 16A and 16B, three antennas 121e, 121f, and 121g are provided at a bottom side distant from each other by 120 degrees, and three antennas 121h, 121i, and 121j are also provided at an upper surface side distant from each other by 120 degrees. In addition, the bottom and the upper surface has a relationship in which the position of the antenna 121 is rotated by 60 degrees. By employing such a placement, the direction can be estimated at the precision that is 60 degrees relative to a horizontal direction.

Next, a direction estimating process by the direction estimating device 102 according to Embodiment 3 is described with reference to FIG. 17. This process is the same as the direction estimating process according to Embodiment 1 and illustrated in FIG. 8 except several parts, and thus only the difference is described. First, the steps S101 to S103 are the same as the processes illustrated in FIG. 8. Next, the radiowave intensity obtainer 111 obtains the RSSI of the radiowave when the receiver 122 receives the radiowave received by each antenna 121 (step S107).

Subsequently, the estimator 113 estimates that the radiowave arriving direction is the intermediate direction between the respective main lobe directions of the directivities of the two antennas corresponding to the first and second antennas in the greater sequence among the RSSIs obtained by the radiowave intensity obtainer 111. Next, the board direction changer 112 outputs, to the drive controller 16 of the flying device 10 via the signal input-output interface 123, an instruction to turn so as to align the forward direction with the direction estimated by the estimator 113 (step S108). Next, the estimator 113 estimates that the radiowave arrives from the upward direction when the placed positions of the two antennas are both the upper surface of the board 120, estimates that the radiowave arrives from the downward direction when the placed positions of the two antennas are both the bottom of the board 120, and estimates that the radiowave arrives from the substantially same altitude as the present altitude of the flying device 10 when the placed positions of the two antennas are the upper surface and the bottom. Next, the board direction changer 112 outputs, to the drive controller 16 of the flying device 10 via the signal input-output interface 123, an instruction to increase the altitude when the direction estimated by the estimator 113 is the upward direction, decrease the altitude when the estimated direction is the downward direction, and not change the altitude when the altitude is substantially consistent (step S109). The processes other than those are the same as those of the direction estimating process illustrated in FIG. 8.

In the step S108, the estimator 113 may estimate that, instead of the intermediate direction that is exactly halfway between the respective main lobe directions of the directivities of the two antennas, the radiowave arriving direction is the direction internally divided in accordance with the RSSI of the radiowave received by the two antennas. Next, the board direction changer 112 may output, to the drive controller 16 of the flying device 10 via the signal input-output interface 123, an instruction to align the forward direction with such an estimated direction. For example, with reference to the forward direction, the angle of the main lobe of the directivity of the antenna to which the radiowave with the largest RSSI arrives is defined as $\theta_1$, and the RSSI thereof is defined as $S_1$, the angle of the main lobe of the directivity of the antenna to which the radiowave with the second largest RSSI arrives is defined as $\theta_2$, and the RSSI thereof is defined as $S_2$. In this case, the estimator 113 estimates that the radiowave arrives from the direction with the angle represented by the following formula (1), and the board direction changer 112 outputs an instruction to turn so as to align the forward direction with such an estimated direction.

$$(S_1 \times \theta_1 + S_2 \times \theta_2)/(S_1 + S_2) \tag{1}$$

When, however, the formula (1) is applied, and when the absolute value of the difference between $\theta_1$ and $\theta_2$ exceeds 180 degrees, the value obtained by subtracting 360 degrees from either the greater one of $\theta_1$ and $\theta_2$ is applied to the formula (1) in such a way that the absolute value of the difference becomes equal to or smaller than 180 degrees.

Figure 17:
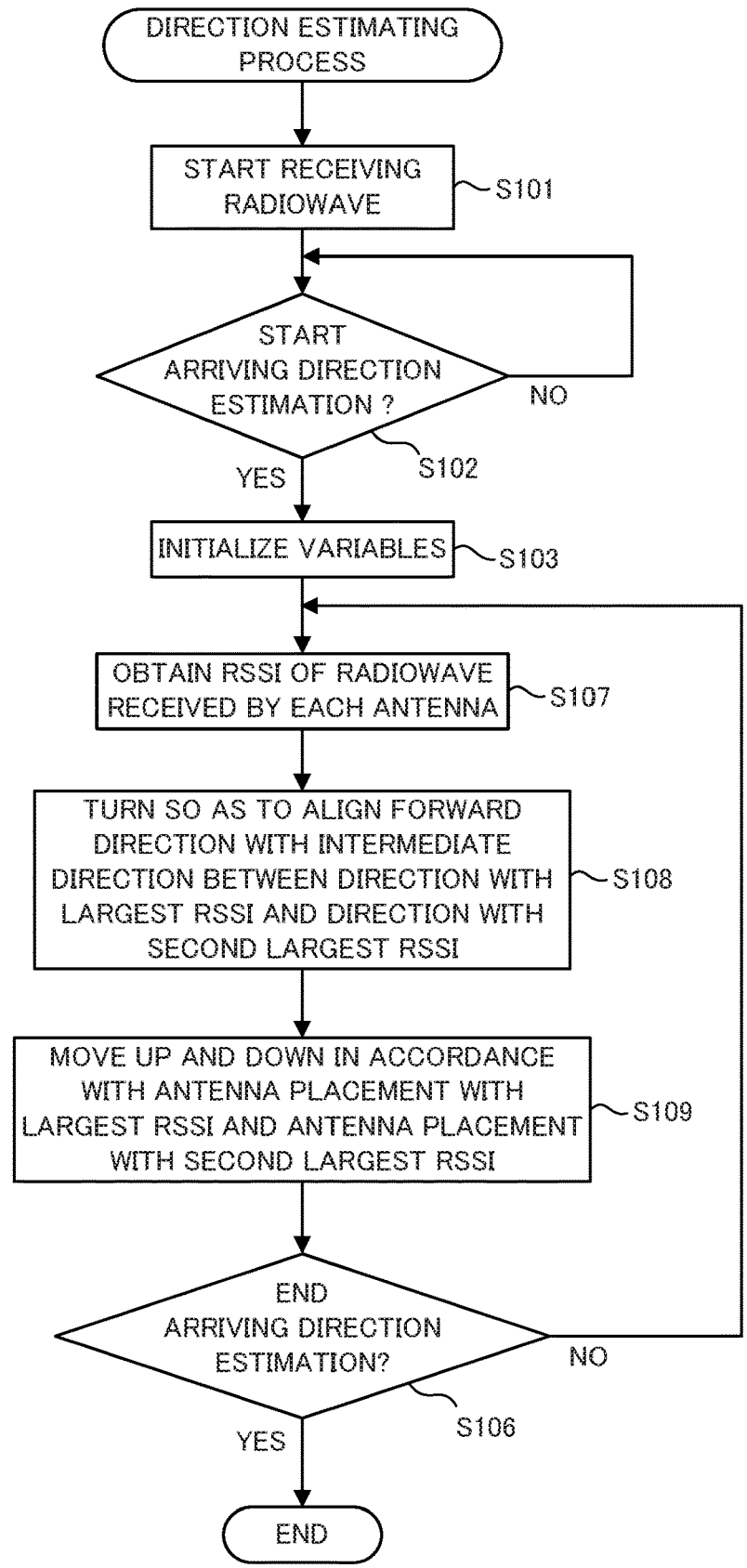
FIG. 17 is a flowchart illustrating a direction estimating process according to Embodiment 3.

The direction estimating device 102 according to Embodiment 3 has the antennas 121 placed so as to eliminate the dead zone in the horizontal direction and in the vertical direction, thus capable of estimating the direction of the terminal device 200 at the present time point based on the RSSI of the radiowave obtained in the step S107 in FIG. 17. Hence, even if the terminal device 200 is moving at a fast speed, the direction estimating device 102 is capable of estimating the direction of the terminal device 200 without missing the radiowave transmitted from the terminal device 200.

The respective embodiments are described above, but those embodiments can be combined together including the modified example. For example, the robot 20 according to Embodiment 2 may perform the vertical direction estimating process according to the modified example of Embodiment 1, and in the vertical comparing process thereof, the process of not changing the altitude but changing the angle β of the head 22 may be executed. In addition, the robot 20 according to Embodiment 2 may include the direction estimating device 102 employing the antenna placement structure of Embodiment 3, and in the step S109 in FIG. 17, a process of not changing the altitude but changing the angle β of the head 22 may be executed.

In addition, as for the direction estimating devices 100, 101, and 102 of the present disclosure, for example, a computer that executes a program may accomplish the functions of the direction estimating devices 100, 101, and 102. The program to accomplish the functions of the direction estimating devices 100, 10, and 102 may be stored in a non-transitory computer readable recording medium, such as a universal serial bus (USB) memory, a compact disc-read only memory (CD-ROM), a digital versatile disc (DVD), or a hard disk drive (HDD), or may be downloaded to the computer via a network.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A direction estimating device comprising:
a plurality of antennas placed on a first surface of a board to have different main lobe directions of directivities, the first surface being configured to face a user, and the plurality of antennas being higher than the first surface;
at least one antenna placed on a second surface of the board different from the first surface, the second surface being parallel to the first surface, and the at least one antenna being lower than the second surface;
a radiowave intensity obtainer that obtains a received signal strength indication (RSSI) of a radiowave received by the plurality of antennas placed on the first surface, and by the at least one antenna placed on the second surface;
a shield plate that is embedded in the board and sandwiched by the first and second surfaces, wherein the shield plate is parallel to the first and second surfaces, has a same area as the first and second surfaces, and prevents the radiowave from arriving from a backward side of the first surface and the second surface; and
an estimator that estimates an arriving direction of the radiowave based on the RSSI of the radiowave obtained by the radiowave intensity obtainer;

wherein a number of antennas on the first surface is greater than a number of antennas on the second surface.

2. The direction estimating device according to claim 1, wherein the first surface is a front surface of the board, and the second surface is a back surface of the board.

3. The direction estimating device according to claim 2, further comprising a board direction changer that changes a direction of the board,
wherein the board direction changer changes the direction of the board in such a way that the radiowave arriving direction estimated by the estimator is aligned with an intermediate direction between respective main lobe directions of directivities of two of the plurality of antennas placed on the front surface of the board.

4. The direction estimating device according to claim 3, wherein a main lobe direction of a directivity of one antenna placed on the back surface of the board is opposite to the intermediate direction between the respective main lobe directions of the directivities of the two antennas placed on the front surface of the board.

5. The direction estimating device according to claim 3, wherein the estimator estimates the arriving direction based on the direction of the board when the board direction changer tilts the board using, as an axis, a straight line causing a plane perpendicular to a straight line extending in the intermediate direction to pass through a center point of the board and to intersect with the board, and the RSSI of the radiowave obtained by the radiowave intensity obtainer.

6. The direction estimating device according to claim 2, wherein:
the antennas are placed alternately on the front surface of the board and on the back surface of the board along an entire circumference of the board to have different main lobe directions of directivities by a predetermined angle, and
the estimator estimates the arriving direction based on a placed position of the antenna receiving the radiowave with a largest RSSI, and a placed position of the antenna receiving the radiowave with a second largest RSSI.

7. The direction estimating device according to claim 2, wherein the shield plate is provided in a middle section of the board in a thickness direction and prevents incidence of the radiowave from the back surface.

8. The direction estimating device according to claim 1, wherein each of the plurality of antennas and the at least one antenna is a chip antenna including a reflector.

9. The direction estimating device according to claim 1, wherein a back side surface of the second surface faces a back side surface of the first surface.

10. A direction estimating method comprising:
obtaining a received signal strength indication (RSSI) of a radiowave received by a plurality of antennas placed on a first surface of a board of a direction estimating device to have different main lobe directions of directivities, and by at least one antenna placed on a second surface of the board of the direction estimating device that is different from the first surface, the second surface being parallel to the first surface;
preventing, by a shield plate that is embedded in the board and sandwiched by the first and second surfaces, the radiowave from arriving from a backward side of the first surface and the second surface, wherein the shield plate is parallel to the first and second surfaces and has a same area as the first and second surfaces; and estimating an arriving direction of the radiowave based on the obtained RSSI of the radiowave, wherein the first surface of the direction estimating device is configured to face a user;

wherein the plurality of antennas are higher than the first surface, and the at least one antenna is lower than the second surface; and wherein a number of antennas on the first surface is greater than a number of antennas on the second surface.

11. The direction estimating method according to claim 10, wherein the first surface is a front surface of a board, and the second surface is a back surface of the board.

12. A non-transitory recording medium having stored therein a program which, when executed by a computer of a direction estimating device, controls the computer to perform operations comprising:

obtaining a received signal strength indication (RSSI) of a radiowave received by a plurality of antennas placed on a first surface of a board of the direction estimating device to have different main lobe directions of directivities, and by at least one antenna placed on a second surface of the board of the direction estimating device that is different from the first surface, the second surface being parallel to the first surface; and estimating an arriving direction of the radiowave based on the obtained RSSI of the radiowave;

wherein the first surface of the direction estimating device is configured to face a user;

wherein the plurality of antennas are higher than the first surface, and the at least one antenna is lower than the second surface;

wherein the direction estimating device comprises a shield plate that is embedded in the board and sandwiched by the first and second surfaces, wherein the shield plate is parallel to the first and second surfaces, has a same area as the first and second surfaces, and prevents the radiowave from arriving from a backward side of the first surface and the second surface; and wherein a number of antennas on the first surface is greater than a number of antennas on the second surface.

* * * * *